(12) United States Patent
McLean et al.

(10) Patent No.: US 7,914,765 B2
(45) Date of Patent: Mar. 29, 2011

(54) REACTOR AND PROCESS FOR THE CONTINUOUS PRODUCTION OF HYDROGEN BASED ON STEAM OXIDATION OF MOLTEN IRON

(75) Inventors: Leslie C. McLean, Burlington (CA); Matthew James Fairlie, Ontario (CA); Andrew T. B. Stuart, Ontario (CA)

(73) Assignee: Available Energy Corporation, Newmarket, Ontario (CA)

( * ) Notice: Subject to any disclaimer, the term of this patent is extended or adjusted under 35 U.S.C. 154(b) by 459 days.

(21) Appl. No.: 12/007,254

(22) Filed: Jan. 8, 2008

(65) Prior Publication Data
US 2008/0166291 A1 Jul. 10, 2008

Related U.S. Application Data

(60) Provisional application No. 60/879,010, filed on Jan. 8, 2007.

(51) Int. Cl.
*C01B 3/10* (2006.01)
(52) U.S. Cl. ........................................................ 423/658
(58) Field of Classification Search .................. 423/657, 423/658
See application file for complete search history.

(56) References Cited

U.S. PATENT DOCUMENTS

| | | | |
|---|---|---|---|
| 1,345,905 A | 7/1920 | Abbott | |
| 1,803,221 A | 4/1931 | Tyrer | |
| 3,442,619 A * | 5/1969 | Schora, Jr. et al. | 423/658 |
| 3,442,620 A | 5/1969 | Huelbr | |
| 3,619,142 A | 11/1971 | Johnson et al. | |
| 3,985,520 A * | 10/1976 | Gold | 48/202 |
| 4,126,668 A * | 11/1978 | Erickson | 423/657 |
| 4,216,199 A | 8/1980 | Erickson | 423/657 |
| 4,310,503 A * | 1/1982 | Erickson | 423/657 |
| 4,338,096 A | 7/1982 | Mayes | |
| 4,389,246 A | 6/1983 | Okamura et al. | |
| 4,406,666 A | 9/1983 | Paschen et al. | |
| 4,555,249 A | 11/1985 | Leas | |
| 4,559,062 A | 12/1985 | Hiraoka et al. | |
| 5,755,839 A | 5/1998 | Malone | |
| 6,350,289 B1 | 2/2002 | Holcombe et al. | |
| 6,620,398 B2 * | 9/2003 | Kindig et al. | 423/359 |
| 6,663,681 B2 | 12/2003 | Kindig et al. | |
| 6,682,714 B2 * | 1/2004 | Kindig et al. | 423/657 |
| 7,335,320 B2 * | 2/2008 | Kindig et al. | 252/373 |
| 2005/0175533 A1 | 8/2005 | Thomas et al. | 423/657 |

* cited by examiner

*Primary Examiner* — Wayne Langel
(74) *Attorney, Agent, or Firm* — Lynn C. Schumacher; Hill & Schumacher

(57) ABSTRACT

The present invention provides a reactor and gasification process for the continuous controlled production of hydrogen ($H_2$) and a by-product synthesis gas (mixture of $CO+H_2+CO_2$), such a process called a hydrogen priority poly-generation process (HPPP). The reactor uses a circulating molten iron process, which is capable of gasifying a variety of carbonaceous materials including low rank coals and biomass. The process employs an iron steam oxidation-reduction cycle in a multi-chamber reactor including a multi-vessel reactor system, where in one compartment or vessel hydrogen is produced by steam oxidation of molten iron; and in a second compartment or vessel the iron is regenerated by carbon reduction of molten iron oxide thereby producing a by-product synthesis gas ($CO+H_2+CO_2$), and excess heat which can be used to produce steam, and in a third step the iron is purified before being returned to the steam oxidation step in the process. An embodiment of this process uses low rank coals having high ash levels in a reactor, which is designed to continuously extract ash from the molten iron bath. A second embodiment uses low ash carbon materials such as highly beneficiated coals in a simpler process that produces pure streams of hydrogen and CO.

19 Claims, 15 Drawing Sheets

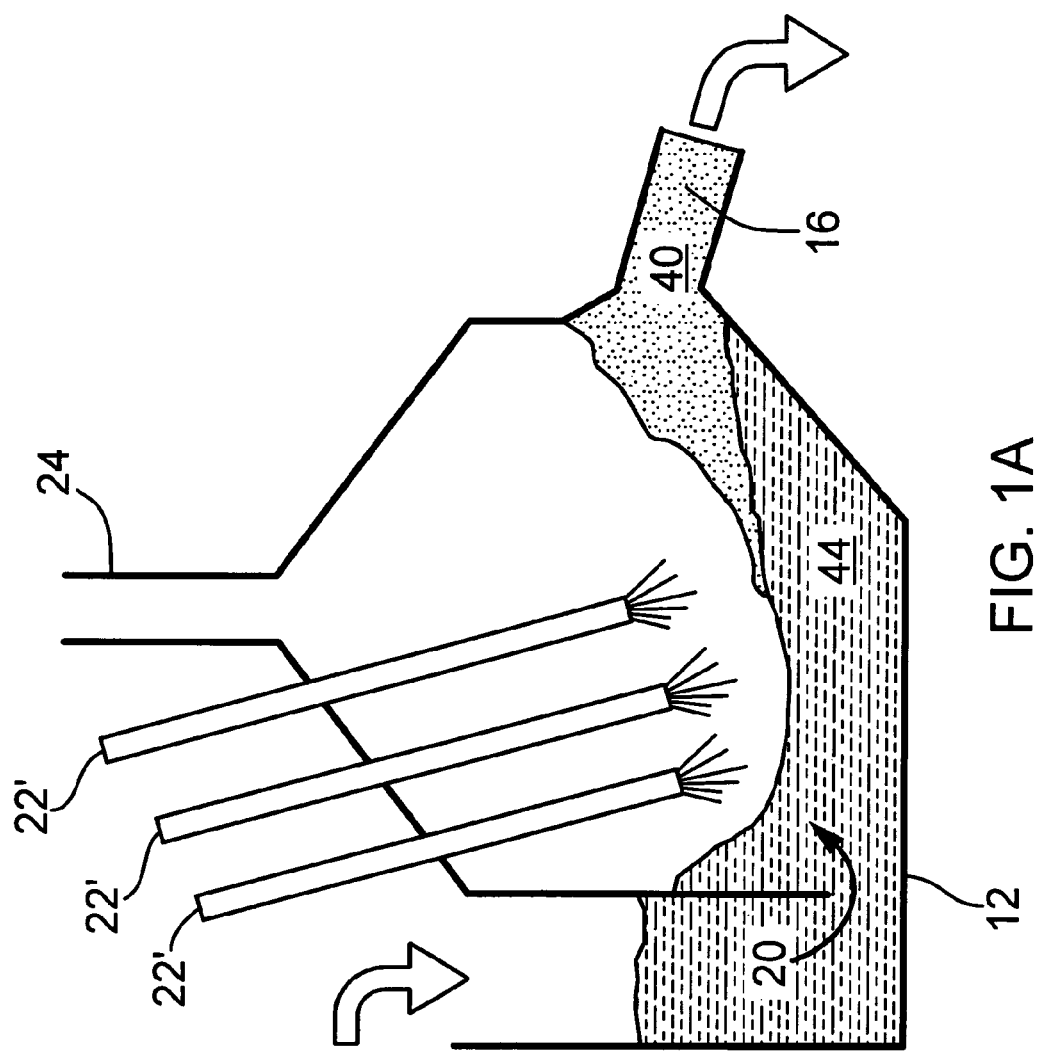

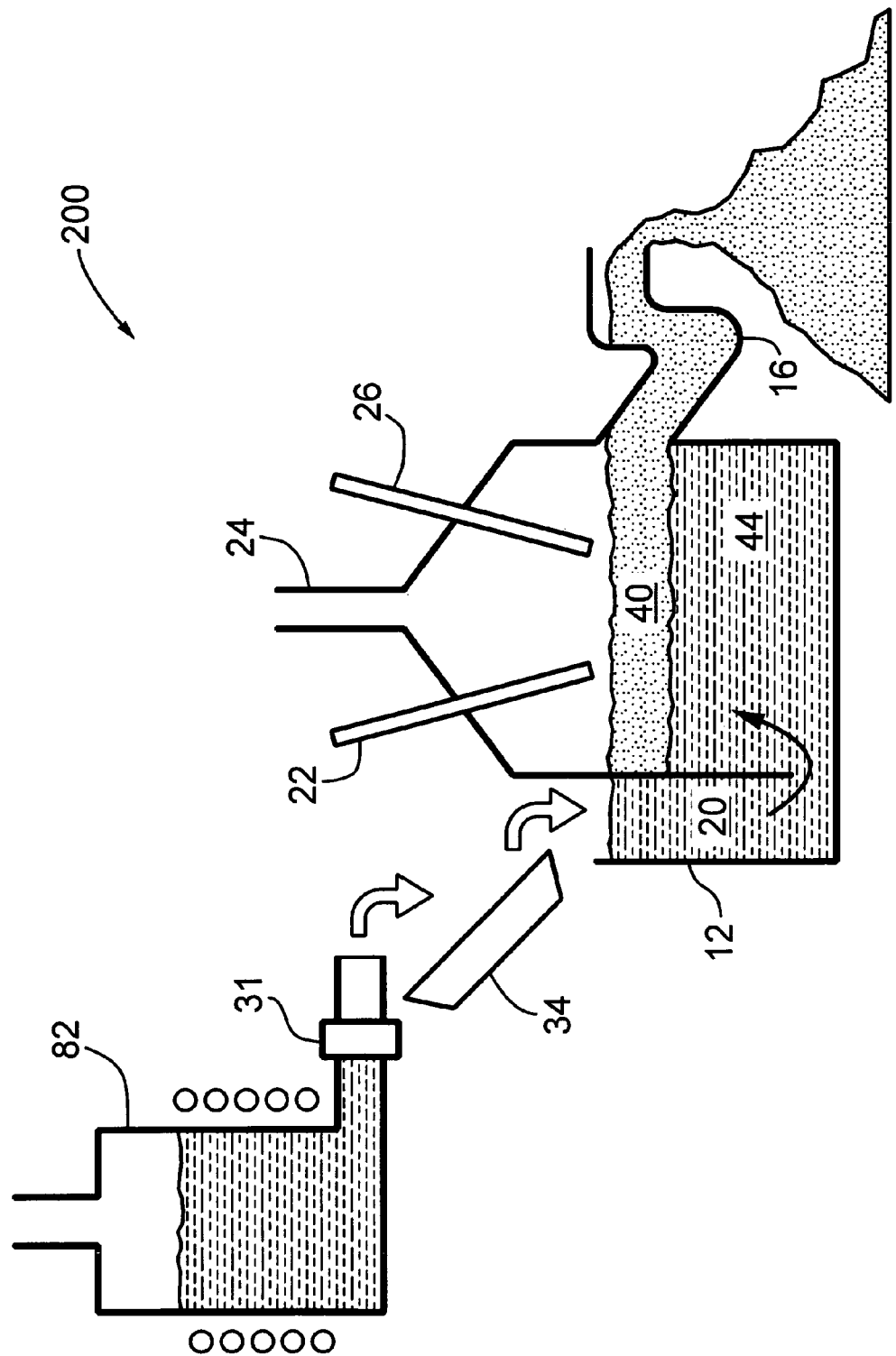

$H_2$ AND ELECTRIC POWER POLY GENERATION PLANT

H₂ AND CO POLYGENERATION PRODUCTION PROCESS PLANT

H2 PRIORITY PROCESS PLANT

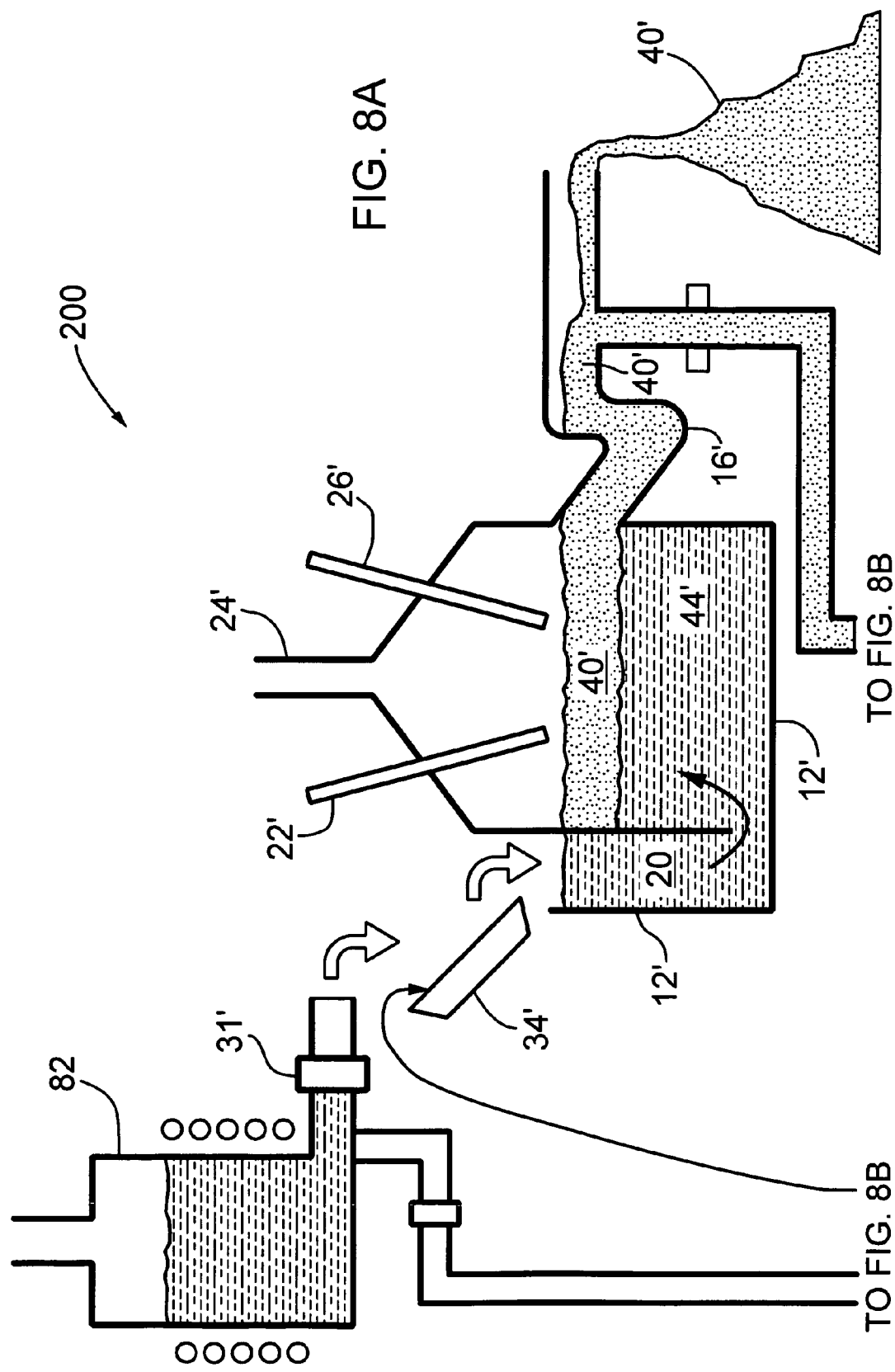

REACTOR AND PROCESS FOR THE CONTINUOUS PRODUCTION OF HYDROGEN BASED ON STEAM OXIDATION OF MOLTEN IRON

CROSS REFERENCE TO RELATED U.S. PATENT APPLICATIONS

This patent application relates to U.S. utility patent application Ser. No. 60/879,010 filed on Jan. 8, 2007 entitled REACTOR AND PROCESS FOR THE CONTINUOUS PRODUCTION OF HYDROGEN BASED ON STEAM OXIDATION OF MOLTEN IRON, filed in English, which is incorporated herein in its entirety by reference.

FIELD OF THE INVENTION

The present invention relates to a method and apparatus for hydrogen production, the hydrogen priority polygeneration process (HPPP), that combines steam oxidation of molten iron and carbon reduction of molten iron oxide to provide a continuous controlled source of hydrogen and a separate by-product synthesis gas.

BACKGROUND OF THE INVENTION

The majority means of hydrogen production today uses steam methane reforming of natural gas (SMR). In North America and in particular Canada, the demand for hydrogen is expected to increase at rates significantly higher than general economic growth because of demands within the petroleum industry, resulting from both the increase in demand from domestic oil supplies as well as the increased need for hydrogen to refine heavier crude oils. At the same time as this demand increase is occurring, "conventional" sources of natural gas in North America are being depleted, tightening the supply of gas and raising gas prices. The increase in demand for hydrogen and reduction in domestic reserves is seen as a long-term trend and is feeding the search for alternative processes of hydrogen production.

The leading alternative to SMR is thermal gasification of carbonaceous materials such as refinery residuals (petroleum coke) or coal by partial steam oxidation, which uses heat, and an oxidant which can be pure oxygen, air and or steam to produce a synthesis gas consisting of CO, $CO_2$ and hydrogen, and depending on the carbon source impurities other gaseous impurities. Gasification processes are well developed in the power industry where the output from gasification is used as a fuel ("BTU") gas to generate electricity such as by a combined cycle gas turbine. If hydrogen production is the priority rather than producing a combustible fuel gas mixture of CO and $H_2$, a second step uses steam and a water shift reactor to convert the CO to hydrogen and $CO_2$ thereby increasing the hydrogen production for unit input of coal or carbon feedstock.

The amount of hydrogen produced depends on the hydrogen content in the feed materials, which determines the amount of hydrogen produced in the gasification step; and the heat content of the feed materials (and amount of oxygen available), which in turn determines the net rate of CO production in the gasification step and hence the amount of hydrogen produced in the water shift process. In the water shift reactor the hydrogen is produced coincidentally with $CO_2$ and so a gas separation process such as pressure swing absorption or amine scrubbing is needed to separate the $CO_2$ from the hydrogen.

A draw back of the thermal gasification process is that the combustion needs to be carefully controlled to insure heat balance and efficiency, and hence the process favors carbon materials with relatively high heat content. Also, as the moisture and ash levels in the carbon material increase, the amount of oxygen needed for combustion increases, more CO is converted to $CO_2$ to provide heat, reducing hydrogen recovery in a hydrogen priority process and yielding a carbon off gas having a lower heating value or BTU content while at the same time increasing the size of the reactor needed. The gas separation process required to extract hydrogen from the output of the gasifier, which is a mixture mostly of $CO_2$, CO and hydrogen, is energy intensive and is a significant adder to the plant cost. The interaction of these variables can result in a variation in hydrogen production rate, resulting in the need for process buffers and storage to average out these variations when connected to down stream processes, making it less suitable than SMR for the controlled delivery of hydrogen particularly for very large hydrogen demands.

The use of steam oxidation of iron is a well-known process for producing hydrogen. The earliest references to steam-iron processes can be traced back to early experiments to isolate hydrogen (Lavoisier 1783) and during the period of the French Revolution when steam oxidation of hot iron filings was used to produce hydrogen as a lifting gas for military dirigibles. Typically a reducing gas, CO and hydrogen, generated from gasification of a carbon feedstock such as coal or wood (char) was used to return the iron oxide to the iron state. Process improvements were introduced where a sequence of reactors operating at different points of the reduction-steam oxidation cycle were set up so as to generate a quasi-continuous hydrogen production rate, such a process was proposed in the U.S. Pat. No. 1,345,905 issued to Abbott (1920).

Combining reduction and steam oxidation in a single reactor to achieve a continuous steam iron process has been proposed for reactants in a solid state (U.S. Pat. No. 3,619,142 (1971) issued to Johnson et al), where the reduction reaction occurs in a fluidized bed of iron oxide and solid carbonaceous materials.

U.S. Pat. No. 4,555,249 (1985) issued to Leas et al. discloses a reactor design using powder iron and iron oxide wherein the density difference is used to separate the material in the two zones, one for steam oxidation and one for reduction. The difficulty with these processes is the rate of reaction and hence hydrogen production rate is very low. Also the steam oxidation of solid iron is a surface reaction; hence the volumetric efficiency of the reactor is low which is a drawback particularly for large production capacities. Controlling the rate of hydrogen production is also problematic for powder systems as it is difficult to achieve a consistent steam oxidation rate in a large fixed bed reactor because steam-oxidation, and hence hydrogen production, occurs at the surface, and the amount of reactant surface is changing and hence the amount of steam needed to achieve a certain hydrogen production rate changes. To achieve a constant rate of hydrogen production a highly variable steam source or a process to remove oxidized iron powder and add new iron is needed.

The issues of low rate of reaction and low surface area, occurring when solid iron filings are used, can be overcome by using molten iron. Earlier processes for decomposition of methane to hydrogen are described where the carbon dissolved into the iron is released by blowing oxygen, see U.S. Pat. No. 1,803,221, (1931) issued to Tyrer. The process of solid carbon injection in molten iron follows from the experience with iron bath smelting and reduction processes such as Hlsmelt (Hlsmelt Pty Ltd, Australia, 1982). Various processes for gasification of solid carbon materials using a molten iron bath have been proposed.

For example U.S. Pat. No. 4,406,666 (1983) issued to Paschen et al. describes a continuous reactor, which involves a molten iron bath and injection of carbonaceous material and oxygen where the carbon material, oxidizing materials and slag forming materials are added below the surface of the melt. In one instance a two-chamber reactor is proposed in which in one reactor carbon, slag forming materials and oxidant is injected into iron to gasify carbon and produce a syn gas composed of hydrogen and CO. The slag is pushed out of the top of the reactor and desulphurized in the second chamber by injection of an oxidant.

U.S. Pat. No. 4,389,246 (1983) issued to Okamura et al. describes a process for injecting oxygen and steam and coal into a single chamber molten metal bath to produce syn gas using non-submerged lances positioned above the molten iron bath. A stirring gas is injected in the bottom of the reactor to stir the molten iron bath. By maintaining a certain geometry and velocity the reaction is contained. As a consequence a minimal amount of the material is ejected from the bath resulting in less slag sticking to the walls of the containment vessel above the molten metal bath, which can result in a constriction impeding materials flowing in and out of the reactor.

U.S. Pat. No. 6,350,289 (2002) issued to Holcombe et al describes various processes for the extraction of hydrogen from coal and carbonaceous materials using molten iron baths. In this case the gasification process produces hydrogen when carbon feeds are injected into molten iron. In a second step oxygen is injected to decarbonise the iron and provide heat to the bath. Typically mixtures of materials are used with a component being a hydrogen rich component or high in hydrogen content such as methane. In this system the iron is not oxidized and instead the process is controlled such that the carbon content in the iron is maintained above a specified limit, in a well-mixed system.

In implementing the process a two-stage process is proposed. In the first stage the carbon material is dissolved into the molten iron and hydrogen is released from the carbon. In the second stage an oxidizing gas is used to release the carbon in the iron. In the steam oxidation reaction the equilibrium oxygen concentration is controlled below the level that a separate iron oxide phase would form. Although this is a very efficient process for gasifying carbon materials to produce a fuel gas, the amount of hydrogen produced depends on the hydrogen content of the carbonaceous feed and hence favours carbonaceous materials such as methane and ethane having a high H:C ratio. The purity could be an issue.

Methods for continuous de-slagging of molten iron reactors are described in U.S. Pat. No. 4,559,062 issued to Hiraoka et al (1984) which involve the use of pressure control valves to create a pressure difference between compartments in a multi-chamber reactor to push slag out of the reactor. In another case the reactor is rotated to move the molten iron from one compartment to another, see U.S. Pat. No. 4,406,666 (1983) issued to Paschen, and in another case gas lift is used to generate circulation in a molten iron loop, see U.S. Pat. No. 4,338,096 (1982), issued to Mayes.

Therefore, there is a need for an economical method of continuously producing hydrogen of high purity at a controlled rate.

SUMMARY OF THE INVENTION

It is therefore an object of the invention to provide a hydrogen production process that overcomes the disadvantage discussed above by providing a process for continuous and controlled hydrogen production from a variety of carbonaceous materials, including beneficiated coals that have low hydrogen content, and that produces a pure hydrogen stream and a pure stream of $CO_2$ suitable for capture and sequestration. In addition, the process, which may be implemented as a two, three, or four compartment reactor system, provides opportunities for removing contaminants sourced from the carbon containing feedstock such as sulfur and phosphorous.

The present invention also improves the availability of the hydrogen production process over that of conventional gasification. By providing an inventory of iron units, to provide a source of iron in the event that liquid iron is temporarily unavailable to the hydrogen-producing reactor from the reduction part of the process the steam oxidation reactor can produce hydrogen as a stand-alone process. In this event iron can act as transportable chemical hydride, which in solid form can be transported to the hydrogen plant from an external resource and supplied to the steam oxidation reactor or a purpose-built "back up" steam oxidation reactor by a supplementary melting unit in the process. The iron oxide produced can be stored, shipped to an iron oxide reduction facility or used at the HPPP site when the temporary unavailability of HPPP equipment is over.

In the case where an alternative hydrogen production technology is used, this above mentioned feature of the invention may serve as a method to increase the availability of the alternative hydrogen production process.

The present invention considers the design of a molten iron reactor that will sustain continuous high purity hydrogen production composed of three steps: steam oxidation, carbon reduction and decarbonization wherein the iron circulates through either two or three distinct reaction zones: a steam oxidation zone where a predominantly hydrogen containing gas is produced and iron is oxidized, a reduction zone where the oxidized iron is reduced, and, in certain configurations, a decarbonization zone where the iron from the reduction process, which is saturated with carbon, is decarbonized and purified to the degree needed before returning to the steam oxidation zone.

In cases where decarbonization does not occur in a separate zone the decarbonization may occur in the same zone as the reduction process by stopping the reduction process or the steam oxidation compartment is modified or built of sufficient capacity to allow for concurrent decarbonization and steam oxidation of iron. The use of a separate reactor will result in iron having a lower carbon concentration and hence higher purity, and hence higher gas purities coming out of the oxidation reactor as well as higher steam conversion efficiencies which will lower operating costs, however it may involve building another furnace reactor and hence a significant increase in capital cost.

The decision on where decarbonization occurs, whether it occurs in a separate reactor or in the reduction reactor or the oxidation reactor or partial decarbonization in both, depends in part on the purity of hydrogen needed, the hydrogen production rate, which determines scale and plant equipment cost, the nature of the carbonaceous material being gasified, and, in the case of the steam oxidation reactor, the ability to preferentially generate iron oxide as compared with carbon monoxide based on the relative concentration of dissolved carbon in the iron-carbon solution and other processing conditions. Additional injection of an oxidant(s) in this vessel, such as air, oxygen, steam or carbon dioxide (though preferably oxygen), can enhance the rate of formation of iron oxide. In certain cases or oxidant mixtures, this could add heat to the steam oxidation reactor.

Thus, in one aspect of the present invention there is provided a method for continuous hydrogen production at a controlled rate comprising the steps of:
  a) oxidizing molten iron by injecting steam at a controlled rate into the molten iron in a first reaction zone to produce a hydrogen containing gas stream and molten iron oxide in the first reaction zone, wherein said molten iron oxide forms a portion of a molten ferrous slag, and collecting and storing said hydrogen containing off gas stream;
  b) circulating the molten ferrous slag containing the molten iron oxide to at least a second reaction zone and reducing said molten iron oxide by injecting a carbonaceous material into said at least a second reaction zone to form a carbon monoxide containing gas stream and carbon saturated molten iron in said at least a second reaction zone;
  c) processing the carbon saturated molten iron to circulate molten iron into the first reaction zone having a reduced carbon content relative to the carbon saturated molten iron in the second reaction zone; and
  d) repeating steps a) to c) to give continuous hydrogen production at a selected hydrogen production rate.

The present invention also provides a method for continuous hydrogen production at a controlled rate comprising:

oxidizing molten iron by continuously injecting steam at a controlled rate into the molten iron in a first reaction zone to continuously produce a hydrogen containing off gas stream and molten iron oxide in the said reaction zone wherein said molten iron oxide forms a portion of a molten ferrous slag, and collecting and storing said hydrogen containing off gas stream and continuously removing the molten ferrous slag phase from the first reaction zone and continuously injecting molten iron into said reaction zone.

In another aspect of the invention there is provided an apparatus for continuous hydrogen production using a molten iron steam iron process, comprising:
  a) at least first and second compartments, enclosing first and second reaction zone respectively, said at least first and second compartments being interconnected by a means of transporting molten iron or iron oxide the first and second compartments configured to hold molten iron, heaters for heating said first and second compartments to maintain iron in a molten state therein, said first compartment including a steam injection system to inject steam into the molten iron and a first gas collector for collecting gases produced in said first compartment, said second compartment including an injection system for injecting carbonaceous containing materials into the molten iron and a second gas collector for collecting gases produced in said second compartment;
  b) a means for processing the carbon saturated molten iron to reduce a carbon concentration in the carbon saturated molten iron in the second compartment;
  c) a means for creating a pressure difference to enable circulation of ferrous slag (FeO) from the first compartment to the second compartment through said conduit, and means for circulating molten iron from the second compartment to the first compartment;
  d) wherein in operation a stream of steam is injected into the first compartment containing molten iron which upon contact with the molten iron, some of the iron is oxidize to ferrous slag (FeO) and the steam reacts to form $H_2$ and wherein the $H_2$ forms part of an off-gas along with remaining steam and is collected in said first gas collector, and the ferrous slag (FeO) is circulated into the second compartment, and wherein injecting a stream of carbonaceous material into said second compartment produces CO and carbon saturated molten iron and the carbon saturated molten iron flows to an alloy phase within said second compartment and, having a higher density then FeO, falls to the bottom of the second compartment, and wherein CO produced from the reduction of FeO is released as an off-gas collected by the second gas collector, wherein said means for treating the carbon saturated molten iron is configured to give a resulting effective carbon concentration of the treated carbon saturated molten iron such that the steam oxidation of iron can occur at a sufficient rate in the said first compartment.

A further understanding of the functional and advantageous aspects of the invention can be realized by reference to the following detailed description and drawings.

BRIEF DESCRIPTION OF THE DRAWINGS

Embodiments of the present invention will now be described, by way of example only, with reference to the attached figures in which:

FIG. 1A is a schematic diagram of a steam oxidation reactor compartment forming part of the apparatus of FIG. 1 shown as a separate vessel which employs multiple lances that are used to create a reaction zone and a build up of iron oxide near the outlet of the reactor;

FIG. 4 is a schematic diagram of another embodiment of an apparatus for producing hydrogen which uses an electric furnace for melting iron for the steam oxidation process;

DETAILED DESCRIPTION OF THE INVENTION

Figure 1:
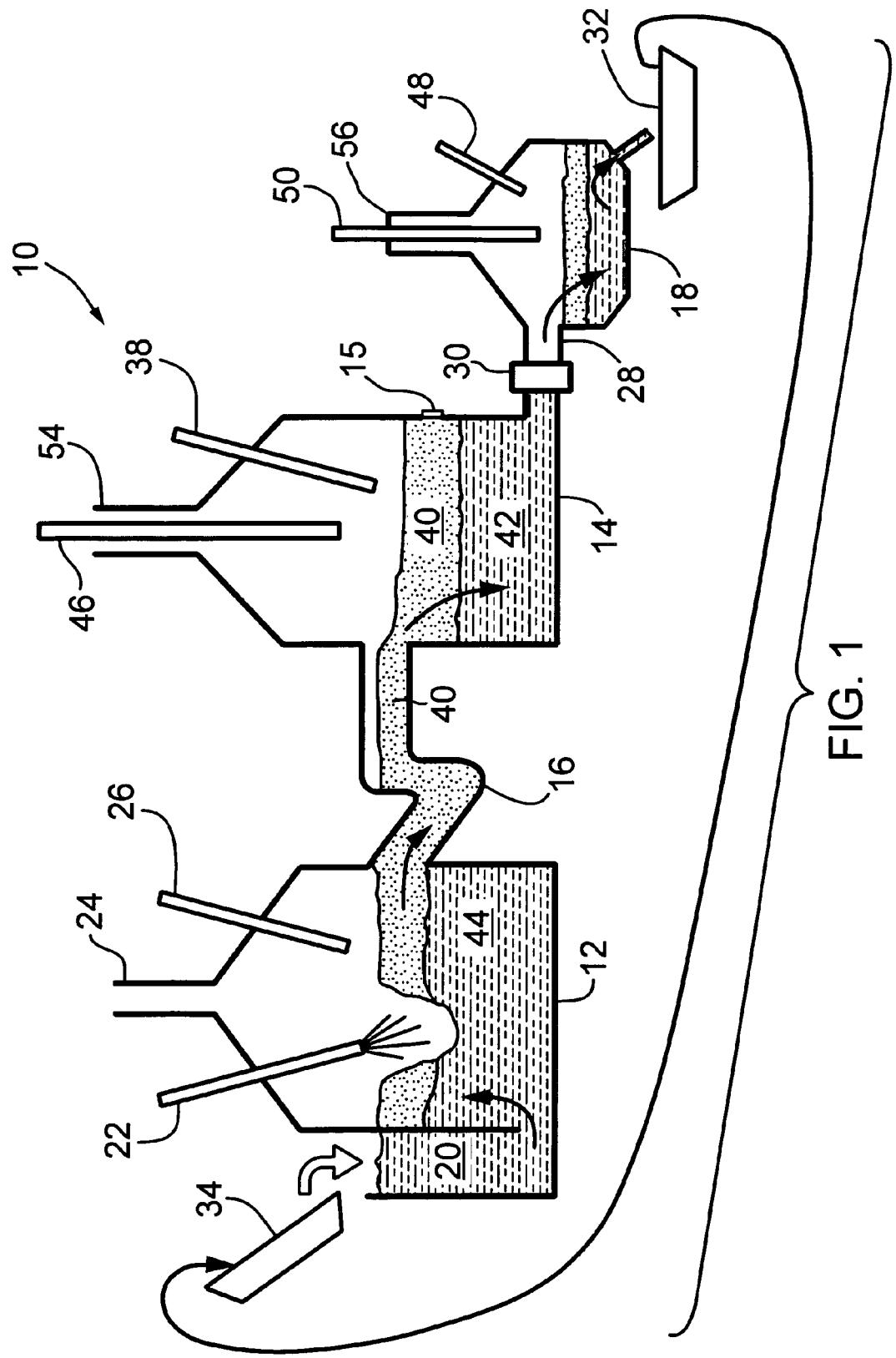
FIG. 1 is a schematic diagram of an embodiment of and apparatus for hydrogen production.

Generally speaking, the systems described herein are directed to methods and apparatus for continuous production of hydrogen ($H_2$) gas. As required, embodiments of the present invention are disclosed herein. However, the disclosed embodiments are merely exemplary, and it should be understood that the invention may be embodied in many various and alternative forms.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to an apparatus for continuous and controllable production of hydrogen ($H_2$) gas.

As used herein, the term "about", and "approximately" when used in conjunction with ranges of dimensions, temperatures or other chemical or physical properties or characteristics is meant to cover slight variations that may exist in the upper and lower limits of the ranges so as to not exclude embodiments where on average most of the dimensions, temperatures, or any other chemical or physical properties or characteristics are satisfied but where statistically they may exist outside this range.

In an embodiment of the present method, a first process step is the steam oxidation of molten iron to convert $H_2O$ and Fe to $H_2$ and FeO which occurs in a first vessel 12 (steam oxidation compartment discussed in detail below) of an apparatus designed for the present method. The $H_2$ becomes part of the off-gas along with steam and carbon monoxide, and the FeO reports to the slag phase floating on top of the molten metal. The circulation of iron in the reactor vessel pushes the molten slag from the steam oxidation compartment to the reduction compartment located in a second vessel 14 (discussed in detail below) and more fresh iron is introduced into the steam oxidation compartment. The level of the iron/slag interface in the steam oxidation reaction chamber is controlled by the addition of iron from a tundish, ladle or other holding vessel acting as a buffer volume. Various techniques of applying a backpressure on the hydrogen gas can be used to evolve the gas at elevated pressures. Such techniques can involve the design of the vessel itself. In the second step of the reaction, occurring in the second compartment 14, a carbon containing feed is injected into the molten ferrous slag (FeO), which flows from the steam oxidation chamber, producing CO and a carbon saturated Fe alloy.

The CO from the reduction of FeO is captured and processed as a fuel which can be used to heat the reactor through injection of oxygen or air and post combustion of the gas mixture above the molten iron bath or it can be collected outside the reactor and used to make steam, power or it can be used as a chemical feed-stock. The carbon saturated Fe alloy reports to the alloy phase and having a higher density then FeO falls to the bottom of the gas-generating compartment, which can be tapped off periodically or in a continuous manner, similar to the iron bath smelters proposed by AISI or Hlsmelt, to a third reaction chamber 18 (for those embodiments which includes a third compartment) to decarbonize the metal.

Alternatively the metal can be returned directly back to the steam oxidation compartment where oxidation and decarbonization occurs coincidentally and CO and $H_2$ are produced simultaneously and CO can be collected as a fuel gas or chemical feedstock or it is converted to hydrogen and $CO_2$ in a water gas shift reactor. A further alternative may include partial or full decarbonization in the second compartment by injection of oxygen (or other gases such as $CO_2$ and steam) through the slag phase or from below the second compartment to the alloy phase for the necessary time to achieve the desired degree of decarbonization.

In order to maintain a consistent hydrogen production rate the concentration of carbon in the iron in the steam oxidation compartment should be controlled along with the steam injection rate to insure that the steam carbon oxidation reaction doesn't dominate the steam iron oxidation reaction where the carbon concentration in the bath can be controlled by controlling the rate or iron addition into the steam oxidation reactor and the oxidation of carbon in iron upstream of the steam oxidation reaction. The concentration of carbon in solution with the iron can be inferred from measurement of the relative quantity of CO with respect to hydrogen in the off-gas which can be checked periodically by taking actual samples of the iron bath. Considering system thermodynamics, and the competition for steam between the steam oxidation of carbon in iron and steam oxidation of iron reactions, the preferred concentration of carbon should be controlled to less than 0.5%, preferably less than 0.1% carbon in iron. Above this level the steam carbon oxidation reaction is more highly favored over steam iron process and so the hydrogen production rate is more difficult to control.

If the process includes a separate decarbonization zone, the third compartment 18 is needed to isolate the reaction. An oxidant, steam, air, $CO_2$, pure oxygen or a combination of these gases, is used to oxidize the carbon in the alloy leaving iron in the alloy phase and generating CO as an off-gas. Depending on the composition of the carbon reductant other treatments such as hot metal desulphurization or flux addition to the slag or alloy may be employed to purify the iron and adjust its characteristics to ensure that the iron is of high purity returning to the steam oxidation reactor.

Such alloy adjustments and purification may occur in a number of locations such as in the second compartment, a compartment within the second compartment, the third compartment, between the second and third compartment, or in the ladle transferring the alloy to the first compartment. Injections of agents may occur from above or below the compartment of the alloy adjustments and purification. The preferred location may depend upon the degree of metal purification required, whether compartment 14 is operating in a batch or continuous mode and other practical factors. The refined iron is tapped off and delivered to the buffer volume (tundish, ladle etc.) feeding the steam oxidation reactor. The circulation of iron in the steam oxidation reactor pushes the iron into the first gas generating compartment where the cycle completes itself.

The method disclosed above using three (3) vessels can be carried out using an apparatus such as that shown in FIG. 1. Referring first to FIG. 1, a first embodiment the apparatus for producing hydrogen is shown generally at 10 and includes a first vessel 12 and a second vessel 14 with the interiors of the vessels 12 and 14 connected by a passageway 16 with the vessels and passageway made of a material capable of withstanding the temperatures of molten iron, molten iron oxide and other materials contained therein.

A third vessel 18 is connected to vessel 14 by a conduit 28 and a valve 30 may or may not be present. Iron regenerated in the third vessel is emptied into a ladle(s) 32 and recycled back to vessel 12. Valve 30 is not needed in the case where the system is configured such that ladle(s) 32 continuously removing metal or alloy, but it is present when slag layer 40 is periodically tapped (unless it is drained through location of valve 30 during periodic tap). Vessel 18 is the vessel in which a decarbonization process is run. The apparatus 10 is configured such that the steam oxidation process in vessel 12 is run in a manner designed to generate a continuous hydrogen stream and the reduction process in vessel 14 is run continuously, near continuously or in a batch mode and the decarbonization process in vessel 18 is run on a batch basis.

This third vessel 18, while shown downstream of the second vessel 14 may be physically attached to the upstream end of the first vessel 12 and the iron may be flowed through the third vessel 18 in either a batch or continuous mode.

There is considerable flexibility in respect of vessel 18 in terms of its location, shape whether or not the process is run in batch mode or continuously. If it is desirable to achieve near total decarbonization to the theoretical minimum amount (about 0.04% C in Fe) then the system configured as shown in FIG. 1 is preferred. An alternative to this vessel 18 may be to inject oxygen from lance (38) into the alloy phase 42 after carbon injection stops discussed hereinafter.

A partial decarbonization (e.g., the functionality of vessel 18 integrated with vessel 14 as a compartment within vessel 14, or the functionality of vessel 18 integrated in conduit 28), may have technical and process advantages over stopping and starting carbon injection into vessel 14. An embodiment of the apparatus that can reduce the carbon down to an intermediate level suitable for subsequent hydrogen and iron oxide production vessel 12 may be achieved by having a version of vessel 18 within vessel 14 or a version of vessel 18 after, but adjacent to vessel 14, before transport to vessel 12.

In another embodiment of the apparatus vessel 18 may be placed adjacent to vessel 14 in which the iron could be partly decarbonized and if necessary, desulphurized. A reason for using a separate vessel is to assist keeping the oxygen tuyeres (if used instead of an oxygen lance from above) from being blocked by metal freezing within them when the blowing of oxygen through them is halted from time to time. Also, this embodiment allows for oxygen injection without stopping of the injecting carbon into the slag in vessel 14, so a separate vessel could be preferred. This separate vessel may be just a separate compartment in vessel 14, just so long as it can be emptied.

Bottom tuyeres are generally lower in cost than a supersonic oxygen lance, but they need to be shrouded in order that they not burn up from the heat generated from the oxidation of carbon and iron. In steelmaking practice, natural gas is used as the shroud gas, since it requires energy to crack the $CH_4$, thus lowering the temperature in the immediate area of the tuyere. A preferred shroud gas in the present apparatus and process is $CO_2$ since it is considerably lower cost than natural gas, and it will aid in the decarbonization reaction.

Sulphur and other impurities can be removed from the iron by injecting chemicals in the second or third compartments or in the vessels that transfer Fe/FeO between chambers to transfer such impurities from the iron to a slag phase which is then removed. In the event that the impurities are gases dissolved in the iron, the iron could be subjected to degassing.

The CO generated as an off-gas from the oxidation of the carbon in the iron may be combined with the off-gases from the reduction reactor compartment to be captured as CO to be used as a chemical feedstock, or used to produce more hydrogen through a water gas shift reactor, or used as a fuel to generate process heat, process steam or process electricity.

A separate vessel adjacent to vessel 14 may be suitably ducted to feed the CO back into vessel 14, which is set up to deal with CO. The relatively small amount of FeO generated in this version of vessel 18 could be carried on to vessel 12, which is an FeO generator in any case, although means could doubtless be found to dump it back into vessel 14 directly.

Vessel 12, which in operation contains the hydrogen producing reaction, is isolated by the molten iron seal on the inlet, 20, and the passageway 16 (configured as a dog leg seal), on the outlet of vessel 12. A stream injection lance 22 is used to inject steam into the molten iron in vessel 12. Injection of steam could also be injected from below vessel 12. Vessel 12 includes an outlet passageway 24 through which the hydrogen produced in vessel 12 can exit and is collected. In operation, the hydrogen production rate is determined by the steam injection rate through lance 22 and the availability of iron, whereas the hydrogen and unreacted steam leave the reactor through reactor outlet 24. The level of the iron maintained in vessel 12 is such that it is below the level of the exit through passageway 16 so that iron is not conveyed to vessel 14.

A lance 26 mounted in vessel 12 is used to inject any desired additives to the molten metal in vessel 12. These could also be injected from below vessel 12. Similarly, lances 46 and lance 38 in vessel 14 and lance 48 in vessel 18 may be used for injecting various chemicals into the respective vessels as will be discussed further hereinafter. Lance 50 in vessel 18 is used for injecting oxidizing agents into vessel 18.

In FIG. 1, vessel 12, which functions as the hydrogen producing reactor compartment (the steam oxidation compartment discussed above), is fed molten iron 44 at a controlled rate from a buffer, tundish (holding vessel) 34, which acts as a buffer between the steam oxidation reaction in vessel 12 and the refining process occurring in vessel 18. The controlled rate may include accelerating the flow rate, slowing it down or maintaining it at a constant rate. The fluid characteristics of iron oxide generated in vessel 12 may be modified by fluxes injected into vessel 12 through lance 26 so that the iron oxide slag, generally in a molten state, flows through the dogleg seal 16 connecting vessel 12 to the reduction reactor compartment vessel 14.

In the reduction reactor compartment, vessel 14, carbon materials are injected through lance 38 into the slag and/or melt to reduce the iron oxide 40 to iron, producing an alloy phase 42 that is saturated in carbon. The alloy 42 is drained periodically from vessel 14 into vessel 18 through conduit 28 and gate valve 30. The ash component in vessel 14 is allowed to build up and is periodically removed from the reactor by emptying most of vessel 14, or through slag tap 15 as shown on FIG. 1C, and replacing the amount of iron (or iron oxide) carried out of the process in de-slagging the reduction and decarbonization reactor compartments. Since FeO from the steam oxidation process in vessel 12 enters the reduction vessel 14 from the top of the vessel, iron utilization, which can be a significant cost component in the process, is lower for a process which is periodically deslagged and which can consume more iron oxide and achieve a lower iron oxide to ash level in the slag than one which is continually deslagging. Periodic deslagging also allows for a variety of different mixing/fluxing strategies to maintain the average reduction rates and iron purities for different carbon streams. The size of the vessels 14 and 18 and buffer 34 are preferably chosen to match the iron demand rate of vessel 12.

The vessel 14 is preferably designed to be large enough to accommodate the accumulation of ash such that the ash content of the slag can be as high as 95% to reduce iron losses including those during periodic deslagging, and the reactor compartment would be tall enough to ensure good phase separation between the alloy phase and slag phase so that a pure alloy phase can be withdrawn from the bottom of the reactor compartment. The accumulated ash contained in the carbon reductant used to reduce FeO would be extracted by deslagging the reactor.

In the process shown in FIG. 1, hydrogen is produced in vessel 12 by blowing steam through lance 22 at high temperature, nominally 600° C.-1200° C., and at high velocity, nominally Mach 2.5, to penetrate the slag layer and react with the liquid iron bath 44 beneath it. Hydrogen gas is produced and collected by a hood mechanism leaving the reactor through outlet pipe 24. Alternatively steam could be added from the bottom of the reactor and the bubbles allowed to rise through the liquid iron 44.

The hydrogen production rate may be controlled by the steam injection rate through lance 22. The purity of the hydrogen gas is controlled by controlling the carbon composition in the iron bath 44 in the steam oxidation reactor which can be controlled by controlling the rate of iron addition into the reactor through tundish 34 and the oxidation of carbon in iron upstream of the steam oxidation reaction occurring in reactor 18 where the amount of carbon in solution with the iron can be measured online by the relative quantity of CO with respect to hydrogen in the off-gas measured in outlet pipe 24 by means such as infrared spectroscopy in the gas phase which can be checked periodically by taking actual samples of the iron bath 44 measuring the composition by means such as by inductively coupled plasma mass spectrometry (ICP-MS). This measurement could also be used to determine concentration of other possible compositional elements which may impact kinetics and steam efficiency in the steam oxidation reaction and which can be used to take corrective actions in the iron refining process in vessel 18.

The out gas, or a portion thereof, released from the reduction process can be used to heat the vessel and thereby keep the bath in a molten state by injection of oxygen through lance 46 and post combustion of CO above the bath where the heat transfer is accomplished in part by the slag and or alloy, thrown upwards by the reaction in the melt, mixing with the gases above the bath. It will be understood that multiple injection lances may be desirable subject to size of the vessel and its design. Oxygen for "post combustion" at the top of vessel 14 for converting CO to $CO_2$ may need to be injected differently than oxygen for decarbonization of alloy 42 in vessel 14.

Ferrous slag FeO 40 is also produced, and this is continuously transferred to vessel 14, through the non-return mechanism, formed by dog seal 16, which ensures that the iron oxide (ferrous slag) 40 flows to vessel 14. This non-return feature in the passageway 16 may exist by maintaining a positive pressure difference between vessel 12 and vessel 14 or by using the vertical "dog leg" to create a seal to prevent backflow of the slag 40 as depicted in FIG. 1.

To increase the steam oxidation reaction rate in vessel 12 more than one steam injector can be deployed and the reactor compartment should be designed to facilitate the phase separation of the iron oxide 40 from the iron 44 such as shown in FIG. 1A where the oxide 40 floating on top of the iron 44 would be pushed out passageway 16 at one end of the vessel 12 where multiple steam lances 22', 22', 22' inject steam at the other end of the vessel 12. The chamber inside vessel 12 is pressurized by adjusting the ferrostatic head in the iron seal 20 such that the pressure differential between the vessel 12 and the reduction chamber will act to push the iron oxide out of the vessel 12 and through the "dog leg" seal or some other non-return device to the reduction reactor compartment—the process being designed to remove iron oxide as soon as possible to inhibit direct reduction of the iron oxide by hydrogen that would convert FeO back to Fe and steam and thereby reduce the efficiency of the process.

In other embodiments, to accommodate more than one reduction reactor compartment, the channel carrying the slag output from the steam oxidation reactor compartment can be designed to route the flow to the reduction reactor compartment which is on duty or to a ladle which can store and subsequently convey the FeO to the appropriate reactor compartment.

Vessel 14 (the reduction reactor) is constructed like a typical iron bath smelter holding a quantity of liquid iron, nominally 150 to 400 tonnes sufficient for a full-size commercial plant to process 3000 to 9000 tonnes of iron a day which is enough iron to produce 100 to 300 tonnes of hydrogen per day. The iron oxide 40 from the steam oxidation compartment defined by vessel 12 is continuously introduced through the top of the vessel 14 or through the side of the vessel above the slag level from vessel 12. The carbon is injected in a high pressure carrier gas through lance 38, the preferred carrier gas being $CO_2$, which preferably comes from the syngas oxycombustion process used to generate steam outside the circulating iron process.

In vessel 14, the slag layer 40 is reduced to Fe and CO by the injection of carbon particles using a high-velocity lance 38 which injects the carbon particles at high speed into the oxide slag layer 40 and ensuring good mixing of carbon, iron oxide and slag. The result of this step is the production of a gas containing CO, $CO_2$ and any volatiles injected with the carbon source. An oxidant may be injected into the upper part of vessel 14 to provide partial or full combustion of CO and volatiles within vessel 14. This can provide a source of heat for the slag phase 40 and the alloy phase 42. The gases then depart vessel 14 through the top of the vessel through the outlet passageway 54. The carbon particles are sized to have a high rate of reaction with the FeO layer, but not so small as to create a "dust storm" in the vessel 14, which would not react efficiently with the slag layer 40. The process of carbon injection in molten iron and iron oxide follows the practices from iron bath smelting and reduction processes such as Hlsmelt (Hlsmelt Pty Ltd, Australia, 1982) where the oxidizing gases and carbon particles are injected at high speed into the molten iron bath using top mounted non-submerged lances as well as other processes involving the injection of carbon and iron oxide into the slag layer to produce liquid iron such as the AISI (American Iron and Steel Institute) Process which was developed in the U.S.A. in the early 1990's, and the DIOS (Direct Iron Ore Smelting) which was developed in Japan also in the early 1990's. An earlier attempt at the same general type of technology is Romelt, which was developed in Russia in the mid-1980's As a consequence of this carbon injection, some carbon dissolves in the iron, in the order of 4% to 5% which is the saturation level. Also the thermodynamic models indicate that iron carbide ($Fe_3C$) may be produced depending on the temperature of the iron. The reduced metal having reacted with the carbonaceous material sinks to the lower portion of the reactor chamber.

Before returning the liquid iron regenerated from the slag to the hydrogen production vessel 12, it may be desirable to remove most of the dissolved carbon and iron carbide and other impurities as needed. Otherwise, the injection of steam into carbon-carrying iron would produce carbon monoxide as well as hydrogen, and this would not be desirable in certain applications or require a further purification step for the hydrogen rich gas leaving vessel 12.

To expel the carbon from the iron a third step is introduced to refine and purify the iron where an oxidizing gas is injected into the carbon-carrying iron before the iron is transported back to the hydrogen production area.

In the diagram in FIG. 1 the liquid iron is transported from vessel 14 to vessel 18 by opening gate valve 30 in conduit 28 on a periodic basis. An oxidizing agent of air or steam or $CO_2$ or pure oxygen is injected through pipe 50. The duration the iron is held within vessel 18 is sufficient to provide the necessary reaction time to lower the carbon content of the iron to an acceptable level, for high purity hydrogen production this level is typically less than 0.05% and preferably less than 0.04%. The oxygen in the injected oxidizing stream reacts with the contents of vessel 18 to oxidize dissolved carbon to CO, which will move upwards to the slag/iron interface and depart the top of the vessel through outlet passageway 56. It will also oxidize the $Fe_3C$ dissolved carbon to produce Fe and CO, and there will be some additional FeO produced, which will also move upwards (because of its density) to the slag/iron interface.

Alternatively, a lance or another conduit in vessel 14, including one from below vessel 14, could be used to enable the blowing of oxygen in vessel 14 typically when carbon injection is halted. The purpose of injecting oxygen in vessel 14 is to remove a portion of the dissolved carbon. In this case ladle 32 of FIG. 1 would be located after vessel 14 and vessel 18 would not be required, as depicted by the embodiment of the system 60 shown in FIG. 1C. Ladle 32 is configured to travel to pour its contents into tundish 34 while tundish 34 is configured to control the rate of metal/alloy added into vessel 12.

Figure 1B:
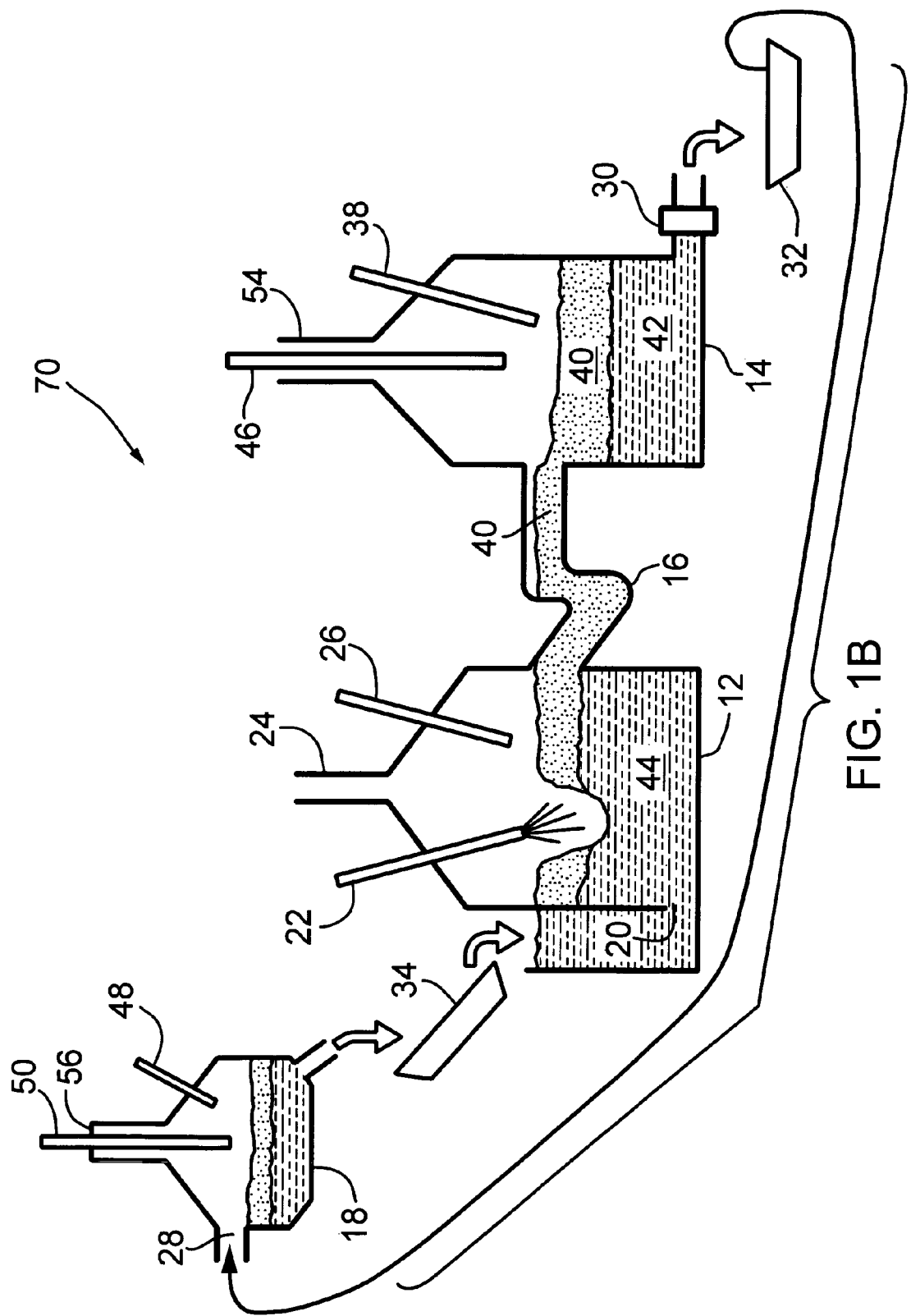
FIG. 1B is a schematic diagram of an alternative embodiment of an apparatus for hydrogen production.
Figure 1C:
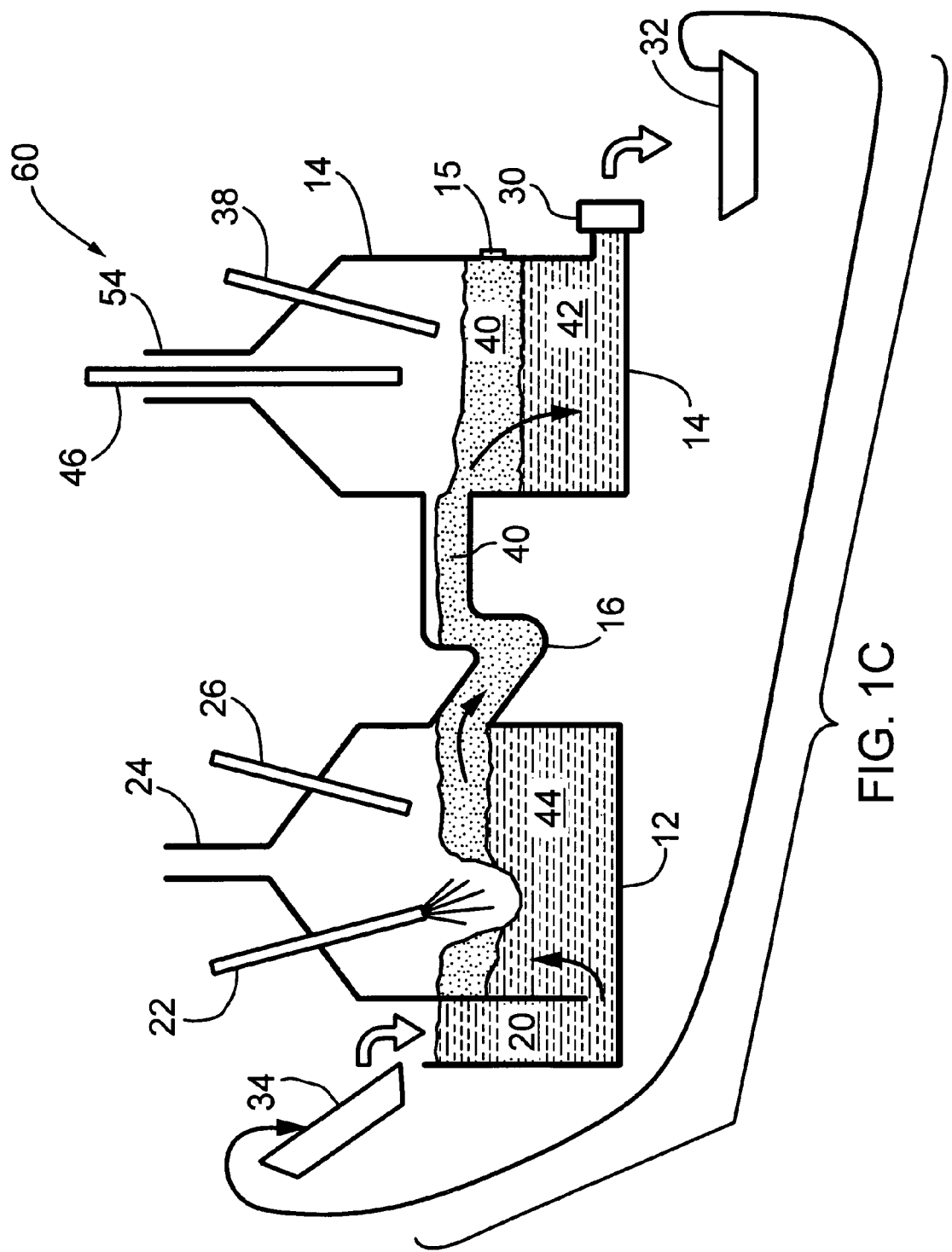
FIG. 1C is a schematic diagram of another embodiment of an apparatus for hydrogen production using only two reactor compartments compared to the apparatus shown in FIG. 1.
Figure 1D:
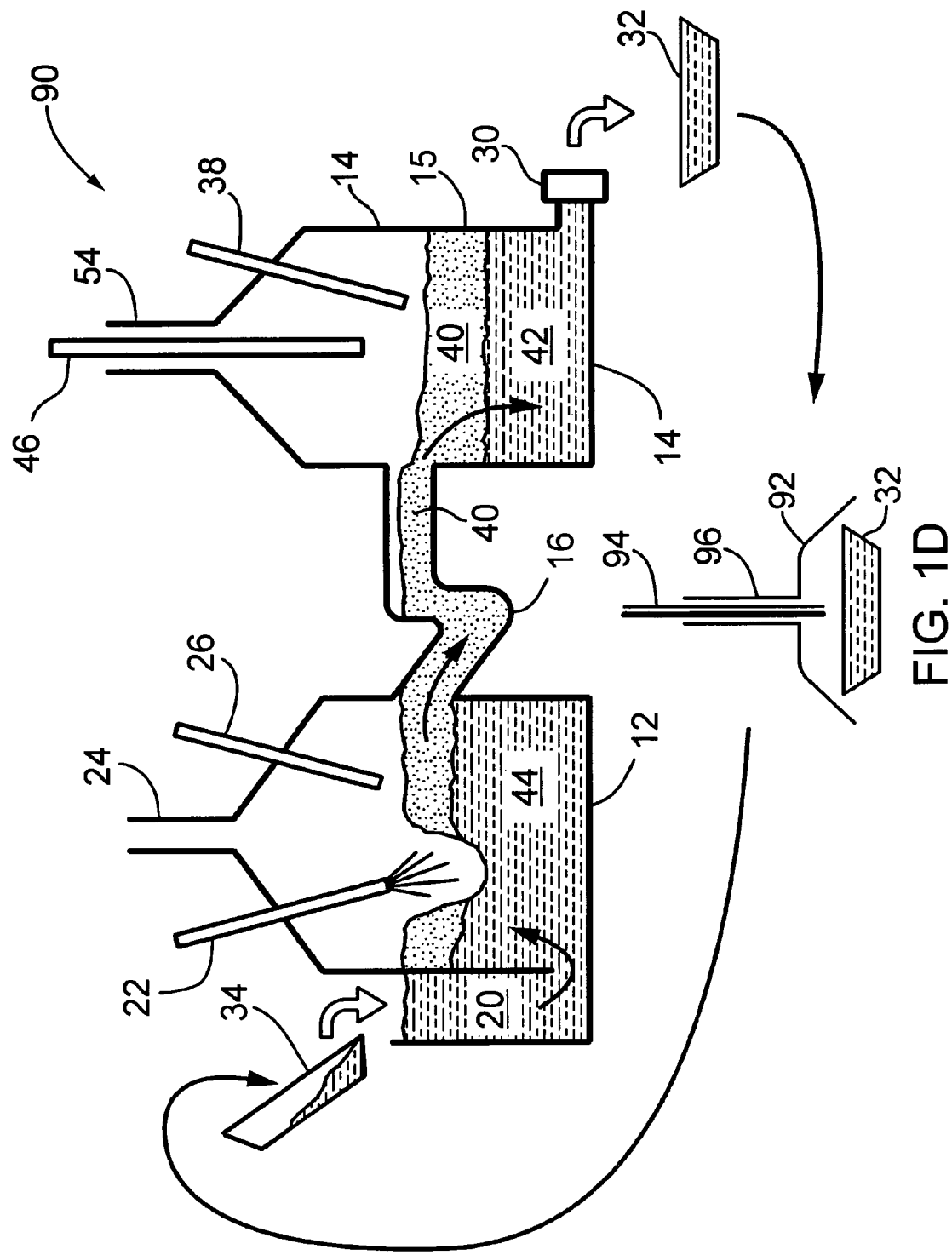
FIG. 1D is a schematic diagram of another embodiment of an apparatus for hydrogen production where the iron is decarbonized in the ladle used to move iron from the reduction reactor to the oxidation reactor.

Alternatively the iron can be decarbonized in the ladle by adding a ladle decarbonizing station, such an arrangement shown generally at 90 in FIG. 1D, where an evacuated hood 92 is placed over the ladle 32 with a sufficient seal such that the CO, generated by injection of oxidant through pipe 94, is collected by vacuum and/or heat convection, generated in the oxidation reaction, through outlet pipe 96. In cases where smaller sized multiple ladles are used, it may be necessary to have a number of decarbonizing stations operated in parallel and, optimally, offset in time to enable a relatively continuous availability of processed iron to be fed into vessel 12. Additional processing of the iron can occur in these ladles to reduce sulphur and other contaminants. With multiple ladle stations operating in a parallel with the appropriate time offset, the ladle could be designed in such a manner to allow steam injection and hydrogen production and iron oxide production as a final step. In this case, the ladle will also act as Vessel 12. After sufficient iron oxide conversion, then the ladle may be drained directly into Vessel 14 or through a tundish mechanism for greater control.

In embodiments of the method where vessel 14 is operated in essentially a continuous manner, then the configuration of the embodiment of the system 70 shown in FIG. 1B would apply where the output from vessel 14 is collected in ladle 32 for transfer to vessel 18 now located adjacent to tundish 34 which replenishes vessel 12 and operated in a batch mode.

In the case of using air as an oxidant the nitrogen being inert is passed through the reaction volume. In the case of steam, water decomposes to hydrogen and oxygen, the oxygen reacts with the carbon and the hydrogen is carried away with the CO. In the case of $CO_2$, the $CO_2$ will decompose in the presence of C according to the Boudouard reaction to produce CO.

The amount of oxidizing agent would be metered to insure that the partial oxygen pressure does not exceed the threshold for producing the FeO phase. Further steps to purify the iron include adding lime (CaO), magnesium oxide (MgO), strontium oxide (SrO), barium oxide (BaO), salt coated magnesium, calcium carbide ($CaC_2$) or other similar agents to extract sulfur as well as adding de-phosphorizing agents lime (CaO), magnesium oxide (MgO), strontium oxide (SrO), barium oxide (BaO), or other similar agents to extract phosphorous which will further purify the iron. Depending on the reaction rate of these chemicals compared with the decarbonization reaction these chemicals may be added, for example, in vessel 14 through lance 46, vessel 18 through lance 48 or in the holding vessels (tundish, ladles or other conduits or areas where reactants can be added and products removed) prior to or after vessel 18. The liquid iron transported from vessel 18 to vessel 12 will therefore have very low carbon content and high purity, acceptable for the production of high purity hydrogen in vessel 12.

The circulation of iron in the reactor, the path of which is shown by the arrows in FIG. 1, is helped by the density difference between slag and alloy. Gas lift in the steam oxidation side of the reactor also helps to lift slag on the steam oxidation side of the reactor. This process can be aided by using an electromagnetic pump and maintaining a back-pressure such that the pressure in the steam oxidation side of the reactor is higher than the reduction side. The electromagnetic pump may also be used as a mechanism to heat iron being transported to or circulated from vessel 12. In terms of construction and materials the working lining of the vessels would be similar to burned or tempered, tar-bonded magnesite 95% MgO brick, 600 mm (24") thick will last, given proper care, for some 6000 hours of operation. The safety lining is preferably fireclay brick, and it is not intended that this lining would ever have to be replaced. Given the extreme environment, and depending on the material used the lances would require refurbishing every 200 to 400 hours or so, and therefore it is common practice to have two (2) or more lances for each vessel, so that they may be "changed out" when required and refurbished.

Alternatively a water-cooled wall may be used where in a protective layer of slag would be formed similar to the membrane wall used by entrained flow gasifiers.

Figure 2:
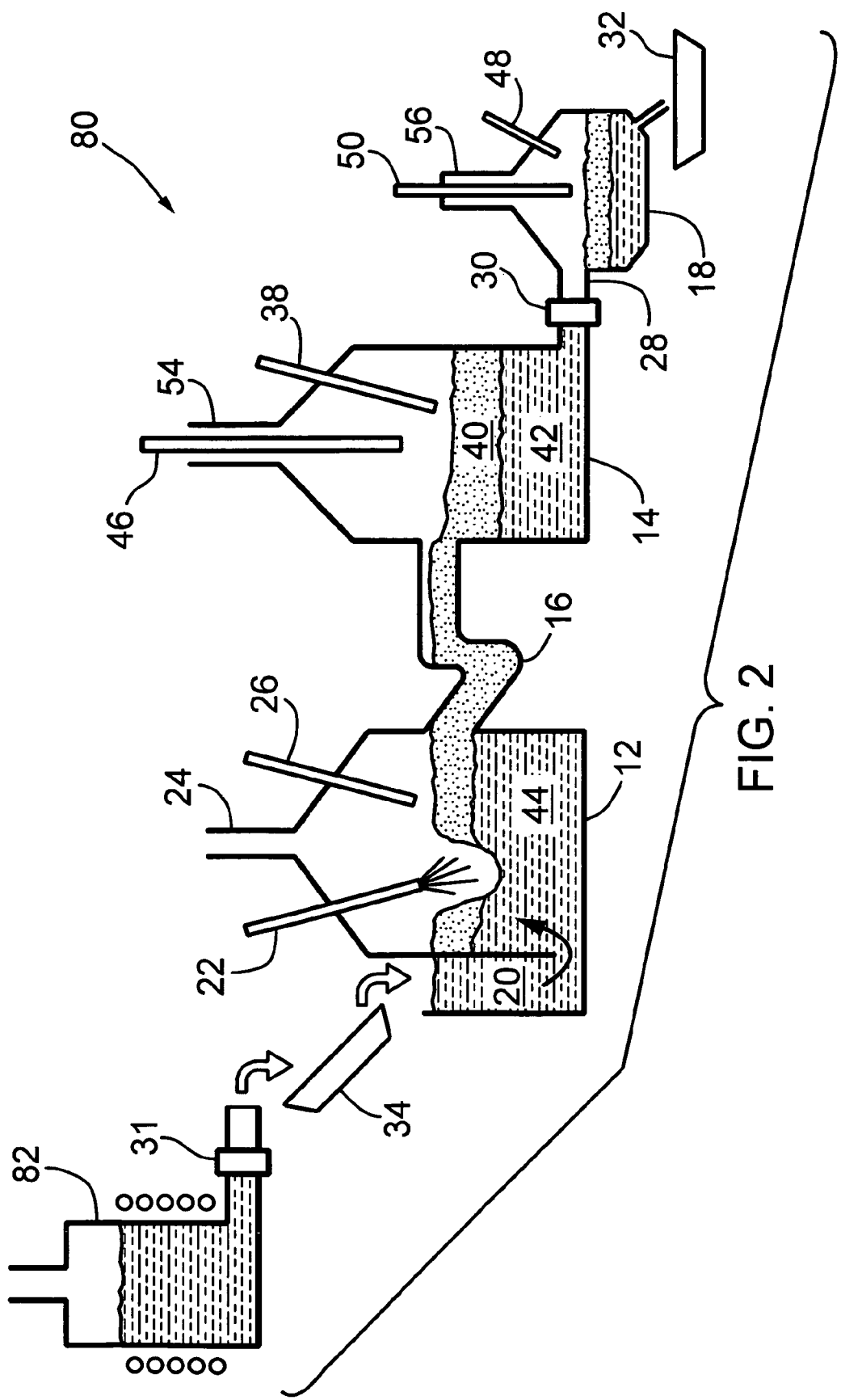
FIG. 2 is a schematic diagram of another embodiment of an apparatus for producing hydrogen similar to that shown in FIG. 1 with the addition of an electric furnace that can be used to add iron to the steam oxidation process to make up for iron lost when the reduction vessel is deslagged and can also be used when the process is started.

In another embodiment of the hydrogen production system, any iron lost in the process may be added on a continuous basis by injecting it into the vessel 12 or, on a batch basis using a separate melter such as the arc furnace, 82 shown in the embodiment 80 in FIG. 2, where the molten iron enters the hydrogen generation process through the steam oxidation reactor vessel 12 as seen in FIG. 2. In embodiments using a batch iron feed to replenish the molten metal, the accumulation of ash in the reduction reactor vessel 14 can be removed by dumping large volumes of slag that will allow longer uninterrupted operation when iron oxide reduction is taking place. To manage the large volumes of slag the reactor vessel 14 may be designed to tilt on a pivot to empty its contents or one or more tap holes 15 could be used.

It will be understood that the process described herein may be implemented with more than the reactor vessels 12, 14 and 18 described above. For example an embodiment of the apparatus may use multiples of vessels 12, 14 and 18 as needed depending on whether or not they may have physical limitations to the size that they can be built. Examples include a configuration of two vessels 12 (each operating at 50% of capacity), one 14 and one or two vessels 18. The present invention is not restricted to an apparatus having single train of vessels as shown in FIGS. 1 and 2. This allows flexibility in the event one of the vessels goes down say for example one of the vessels 12 and it would be possible to ramp up the other vessel 12 and continue to make $H_2$ as per FIG. 4.

Figure 3:
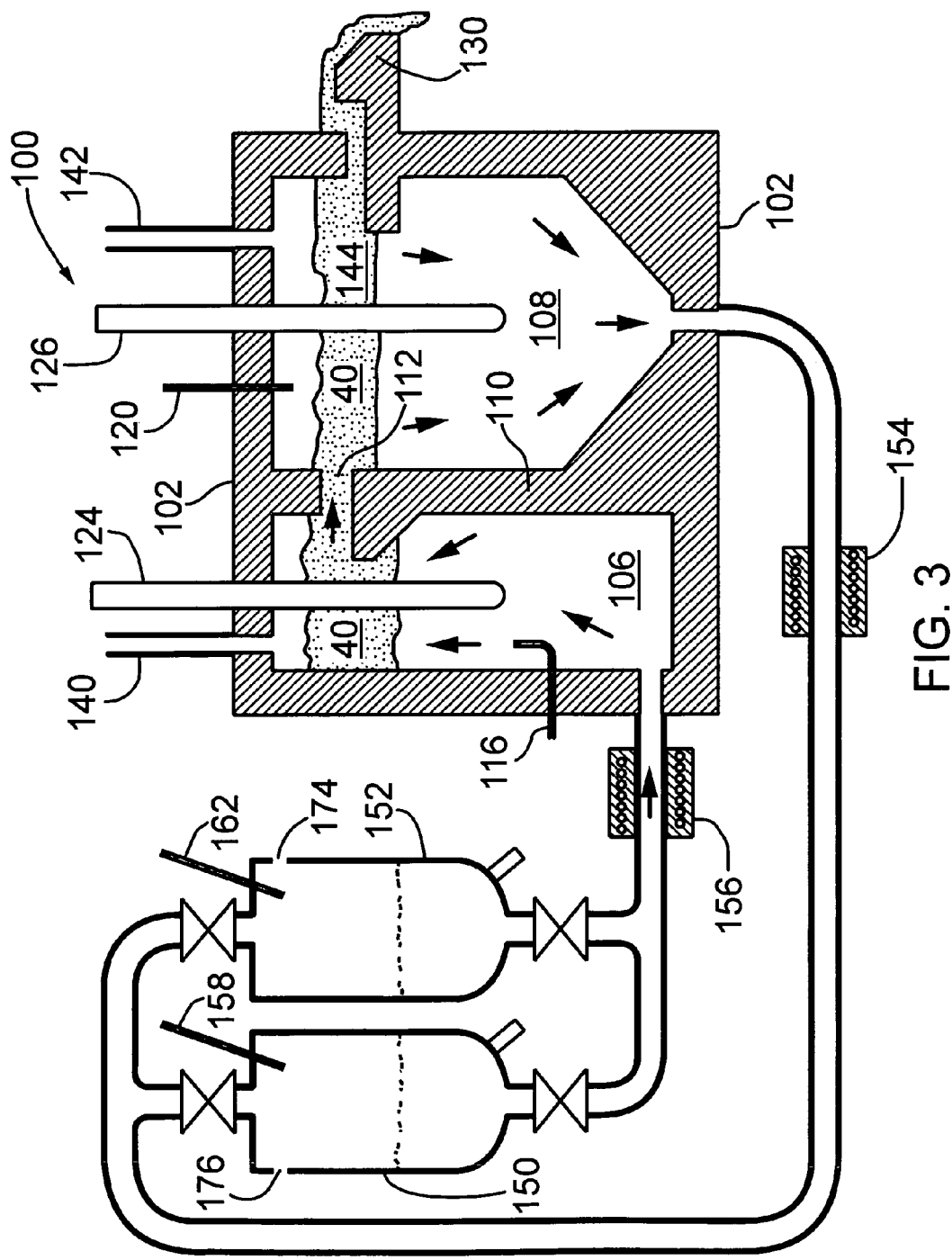
FIG. 3 is a schematic diagram of another embodiment of a hydrogen production reactor for which the steam oxidation and reduction compartments are built into a single vessel.

FIG. 3 shows an embodiment of an apparatus for producing hydrogen shown generally at 100 which is configured to have a single-vessel 102 containing two reactor compartments 106 and 108 generally separated by a common wall 110 but in communication with each other by a passageway 112 as shown in FIG. 3. The compartment for steam oxidation is compartment 106 and the compartment of reduction is compartment 108. Similar to FIG. 1 steam is injected into compartment 106 in this case below the level of slag 40, through a tuyere 116, and hydrogen is generated in compartment 106 by the oxidation of iron at a controlled rate. The compartment 108 is isolated by the molten iron seal provided by the electromagnetic pump 154 and the pressure difference between compartments 106 and 108. The chamber 108 is preferably made with the same materials of construction as the reduction vessel 14, in FIG. 1.

Hydrogen gas is produced in chamber 106 below slag layer 40 and exits compartment 106 through outlet pipe 140. The carbon reductant is injected into the slag layer through lance 120, the CO produced by the reduction reaction leaves the reactor through outlet pipe 142 and the reactor is drained from the bottom. In this case the reactor is designed for high ash coals and so incorporates two features to handle these materials. The first feature, high ash coals having lower carbon yields and therefore reduced CO production, the bath is heated electrically using carbon electrodes, 124 and 126, rather than post combustion of CO above the melt as in FIG. 1 and to handle the higher ash levels which are typically 25% in low grade lignites, the reactor is designed so that ash-rich slag, 144, is continually extracted from the reactor in this case using a dam and dogleg seal 130.

The decarbonization step occurs in two chambers, 150 and 152 such that one chamber is available to dispense decarbonized iron to the steam oxidation reactor compartment while the other is being filled or is undergoing the decarbonization/purification process. Oxygen lances 158 and 162 are inserted into chambers 150 and 152 respectively. Vents 176 and 174 at the top of chambers 150 and 152 respectively are for collecting the resulting CO gas produced during decarbonization.

An electromagnetic pump 154 rather than ladle is used to transport the iron from the reduction vessel 108 to the purification vessels 150, and 152. The design presented in FIG. 3 practices the basic elements of the HPPP process and has the advantage of being a closed system. This advantage however is offset by the close coupling of the components, reducing process operating flexibility such as adding units when units are taken offline for maintenance.

In an operating system the reduction rate can be made to match the steam oxidation rate by adjusting the overall feed to the reduction reaction. By metering the steam and controlling the slag layer in the steam oxidation process, a wide range of turndown on process output is achieved, an advantage over current SMR and gasification processes.

Maintaining the slag basicity is useful for insuring the fluid properties of the slag in the reactor. Methods that are common practice in the steel industry can be applied to modify the fluidity of the slag. Flux can be added to anyone of the reactor compartments, as required, through the carbon and steam lances. As some iron will be removed from the reactor in the de-slagging process iron can be added to either side of the reactor by injection through the lances in the steam oxidation or reduction gas generating chambers or by adding liquid iron to the holding vessel (inlet buffer volume) feeding the steam oxidation chambers.

The hydrogen production rate may be controlled by the steam injection rate and the purity of the hydrogen gas is controlled by controlling the carbon composition in the iron bath in the steam oxidation reactor which can be controlled by controlling the rate or iron addition into the reactor and the oxidation of carbon in iron upstream of the steam oxidation reaction where the amount of carbon in solution with the iron can be measured online by the relative quantity of CO with respect to hydrogen in the off-gas which can be checked periodically by taking actual samples of the iron bath.

The heats of reaction are quite different for the reactions and heat from reactions from the decarbonizaton reactor compartment, or the location of decarbonizaton itself as the case may be, would have to be carried over to the steam oxidation side of the reactor to make up for cooling effect of the steam.

Referring again to FIG. 1, the temperature of the iron can be increased by extending the oxygen injection in vessel 18 and burning the iron (creating FeO) thereby superheating the liquid iron before it enters the steam oxidation reactor 12. Depending on the composition of the carbon used in the reduction reactor vessel 16 oxygen would be added through lance 46, or another lance not shown, to add heat to the reaction through combustion of the CO above the melt. Alternatively oxygen can be injected into the iron contained in any of the vessels or electrodes acting as resistance heaters can be inserted into the melt.

In any case it would be desirable to reduce the volume of the steam oxidation reactor compartment to minimize heat losses. The volume of the steam oxidation compartment could be reduced by increasing the dilution rate in the compartment (the alloy flow rate over volume of steam oxidation compartment) and by pressurizing the reactor to reduce void (steam) volume in the alloy phase in the steam oxidation side of the reactor. External heaters on the steam oxidation side may also be required.

The molten iron process can be designed to accept a variety of materials. In the apparatus 100 shown in FIG. 3 the single vessel reactor is shown with a continuous deslagging process suitable for high ash coals. Similar to steel-making the ash forms a nonferrous slag layer which because it has lower density floats above the iron oxide rich ferrous oxide slag layer in the reduction chamber.

The nonferrous slag will accumulate as the amount of carbonaceous material injected increases. Excess slag could be removed from the reactor in a continuous slagging process as described in U.S. Pat. No. 4,406,666 (1983) issued to Pashen et al. through a "dog leg seal" 130. The electromagnetic pump 156 can assist by pushing the iron oxide from the steam oxidation side of the reactor (compartment 106) to the reduction side of the reactor (compartment 108) pushing the ash from the reduction of iron oxide through the "dog leg" seal 130.

Figure 3A:
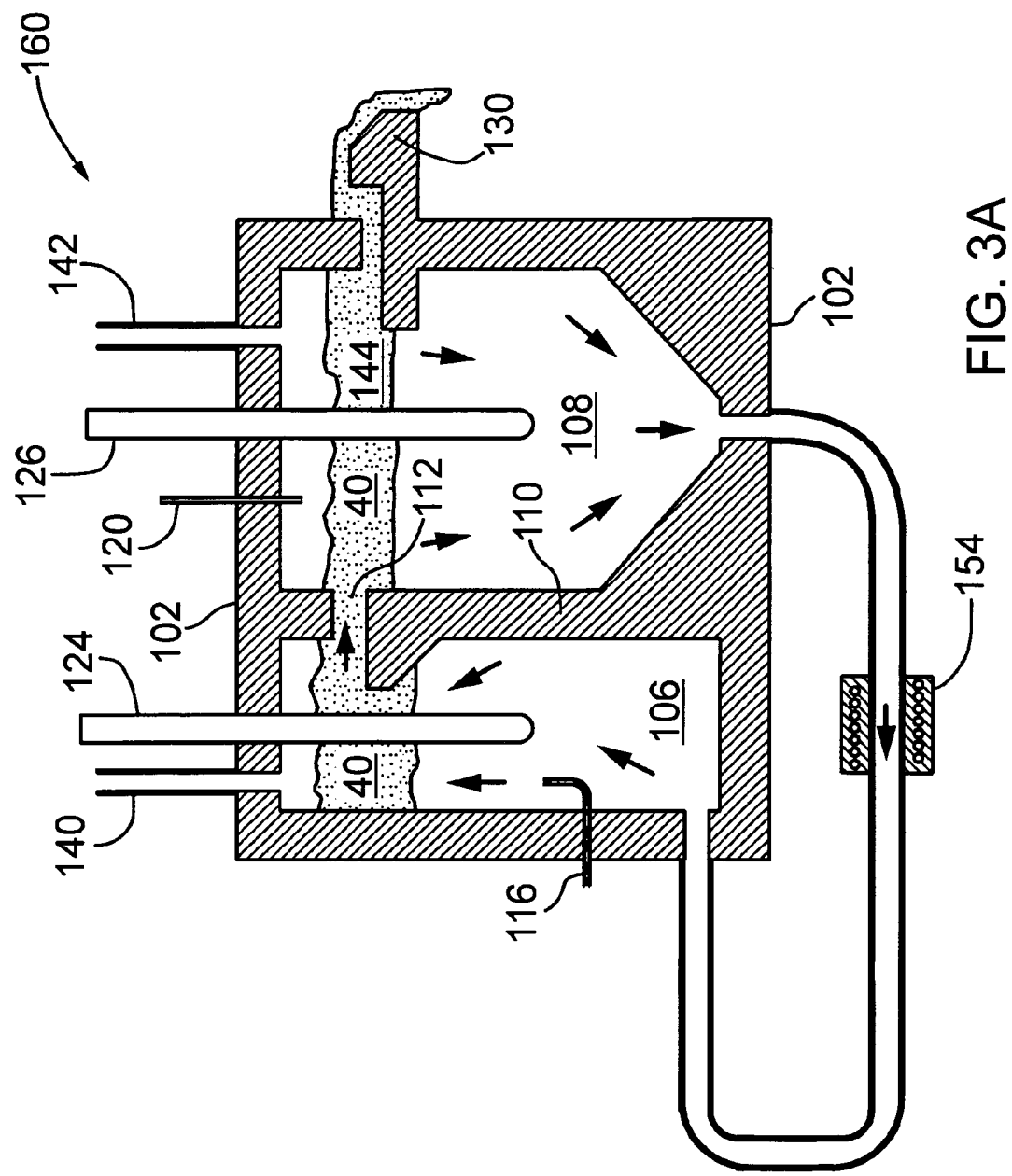
FIG. 3A is a schematic diagram of another embodiment of a reactor similar to the reactor in FIG. 3 where the steam oxidation of the carbon in the iron and steam oxidation reactions occur in the same compartment and where the iron can be partially decarbonized by injection of oxidant in the reduction compartment.

The process performed using the system 100 in FIG. 3 can be simplified by dropping the two separate decarbonizaton reactor compartments as shown in the embodiment 160 shown in FIG. 3A and combining either the oxidation and decarbonization steps in the steam oxidation reactor compartment 106 or inject an oxidant through 120 into the reduction reactor compartment 108 after the carbon injection through 120 is stopped and before the alloy is drained from the reactor compartment 108. Combining decarbonization through steam oxidation of carbon in the iron and steam oxidation of the iron has the disadvantage of lowering the steam efficiency in the steam oxidation reaction and relies on the volume of iron in the steam oxidation being large enough to dilute the concentration of carbon in iron low enough so that the steam iron oxidation process can achieve the required reaction rate and hence hydrogen production rate.

Figure 3B:
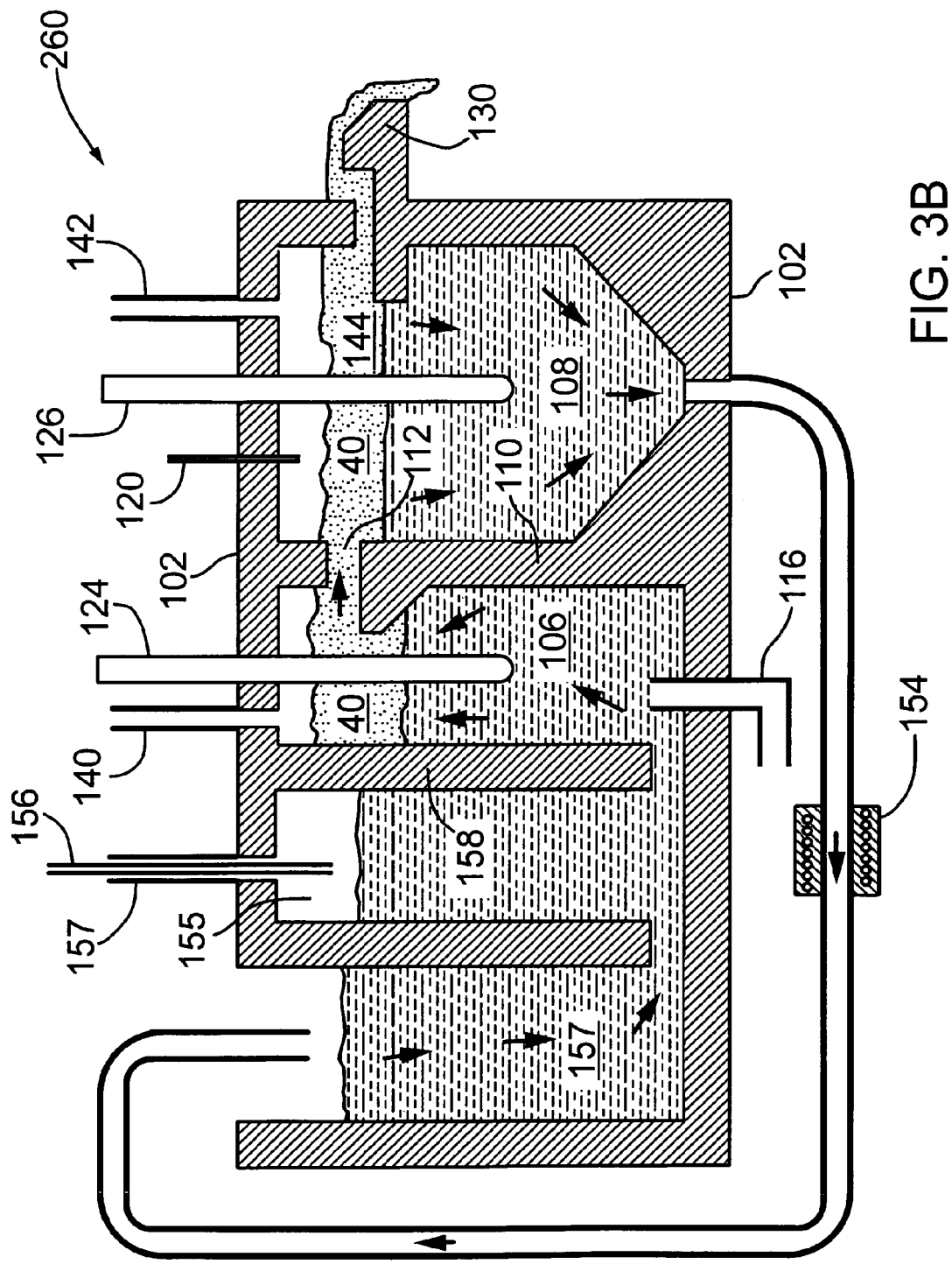
FIG. 3B is a schematic diagram of another embodiment of a reactor similar to the reactor in FIG. 3 where the oxidation of the carbon saturated iron occurs in a pre-chamber to the compartment where steam oxidation occurs such that the two compartments share the same iron bath but are divided such that the CO produced in the pre-chamber by oxidation doesn't mix with hydrogen and the oxidized iron slag is predominantly in the steam oxidation reactor.

In apparatus 260 shown in FIG. 3B the decarbonization process is aided by adding a pre-chamber 155 just before chamber 106 where oxidation of the carbon in the iron bath can occur by direct injection of oxygen through pipe 156 and the outgases containing CO produced collect at the top of the reactor and leave through outlet 157. The pre-chamber 155 would be designed with a wall, 158, such that the off gases from the oxidation reaction are not mixed with the hydrogen produced in the steam oxidation reaction in chamber 106. A small amount of FeO slag will be produced in pre-chamber 155 which can be removed periodically through a slag tap (not shown) on the pre-chamber 155 and added back into the process as part of the iron make-up system (not shown). The advantage of the direct injection of oxygen over steam in decarbonization is that the reaction rate is higher as well as the heat of reaction and so the carbon oxidation reaction using oxygen can be used to heat the bath. Chamber 155 receives the iron from chamber 157 which receives the recycle iron from chamber 108. Chamber 157 could be closed to the atmosphere and its pressure regulated by an inert gas to assist in managing levels and flows of material through the apparatus 260. The decarbonization reaction in pre-chamber 155 would be controlled to achieve a desired carbon concentration in the iron bath 106 as measured by the CO concentration of the hydrogen leaving outlet 140 in the same manner as described for 10 in FIG. 1.

In another embodiment the reactor may be configured to take very pure carbons such as carbon black. In this case the slagging would occur on an infrequent basis.

A key requirement for hydrogen supply systems is availability which has been a weakness of conventional gasification systems. In the embodiment of the apparatus 200 shown in FIG. 4 this issue is addressed in the HPPP process by using an inventory of iron and an iron melting process such as the electric arc furnace 82, with valve 31 open when in operation, as shown in FIG. 2. The advantage of such a back up systems is in the storage capability. A 300 tonne store of iron can produce approximately 10 tonnes of hydrogen which is equivalent to approximately 4,100,000 SCF of hydrogen gas storage capacity. Proportionately larger stores of iron can produce proportionately larger portions of hydrogen. This provides a unique capability to back up hydrogen production from allowing for days or even weeks of iron availability in the event that other components in the apparatus 10 FIG. 1 fail to function.

Figure 8B:
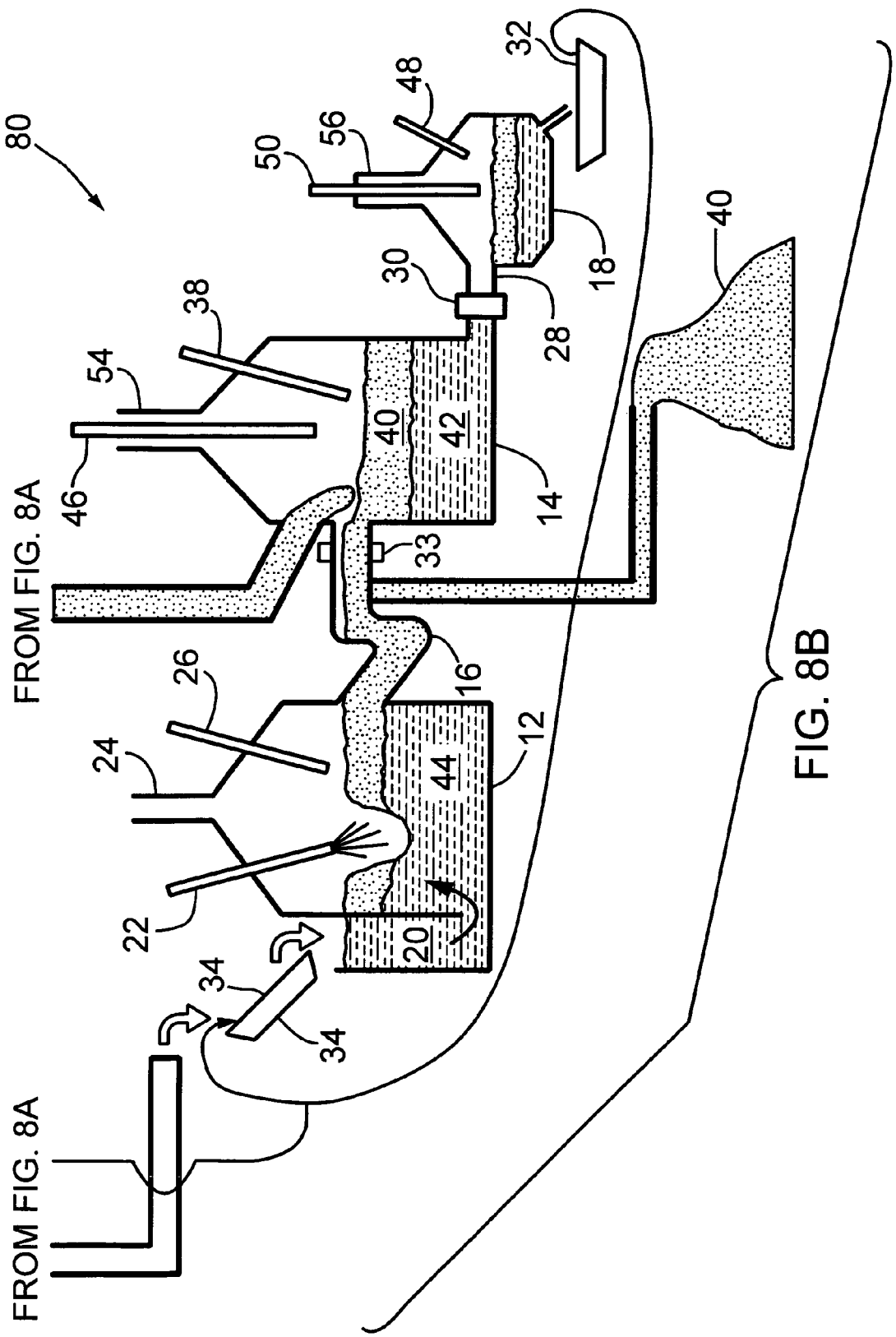
FIG. 8 shows an embodiment of an apparatus that combines the embodiment of FIG. 4 (apparatus 200) and the embodiment of FIG. 1, (apparatus 10) plus additional components.

FIG. 8 shows an embodiment of an apparatus that combines the embodiment of FIG. 4 (apparatus 200) and FIG. 1, plus adding tundish 34' which is fed molten iron by ladle 32, diverter valve 33 between 12 and 14 as well as between redundant 33' diverter valve between redundant 12' and the said 14 vessel (zone). FIG. 8 represents a highly reliable variation of embodiment of the system in FIG. 1. The following equipment items are added to those shown in FIG. 1: a redundant tundish 34', a redundant first compartment, 12', as well as an iron melting device 82 with control valve 31 and 31', and diverter valve 33 between 12 and 14 as well as diverter valve 33' between 12' and 14.

In normal operation of the highly reliable system, reaction compartments 12 and 12' would each operate between 0% and 100% of the desired total hydrogen output capacity but in a manner so that their individual operating capacities when added together are 100% of the required hydrogen production capacity. Ferrous slag discharge 40 and 40' would travel through open valves 33 and 33' and both flow into compartment 14. The process then operates as a single train unit until ladle 32 provides processed iron to tundish 34 and 34'. Solid iron melting device 82 would add make-up liquid iron to compartment 12 by opening valve 31 from time to time and add make-up liquid iron to compartment 12' by opening valve 31' from time to time.

The advantage of the zone 12 with redundant zone 12' is achieved under the following scenarios:
  a) if either one of 12 or 12' fails, the other can be quickly brought up to 100% of hydrogen production capacity to allow continued controlled hydrogen production,
  b) if there is a failure in 14, 18 or 32 and either 34 or 34', then the system can operate as per FIG. 4 wherein liquid iron from iron melting device 82 is added to the working 34 or 34' which then directs molten iron to either or both 12 or 12' and diverter valves 33 and 33' (as the case may be) are closed. Molten iron oxide slag 40 or 40' (as the case may be) is then accumulated externally, perhaps in a slag pot, not shown. Provided there is sufficient stored liquid iron at site or stored solid iron which can be fed into iron melting device 82 and 82 can melt that iron at the rate required to provide iron to 12 or 12' (as the case may be) hydrogen production can be sustained.

Figure 5:
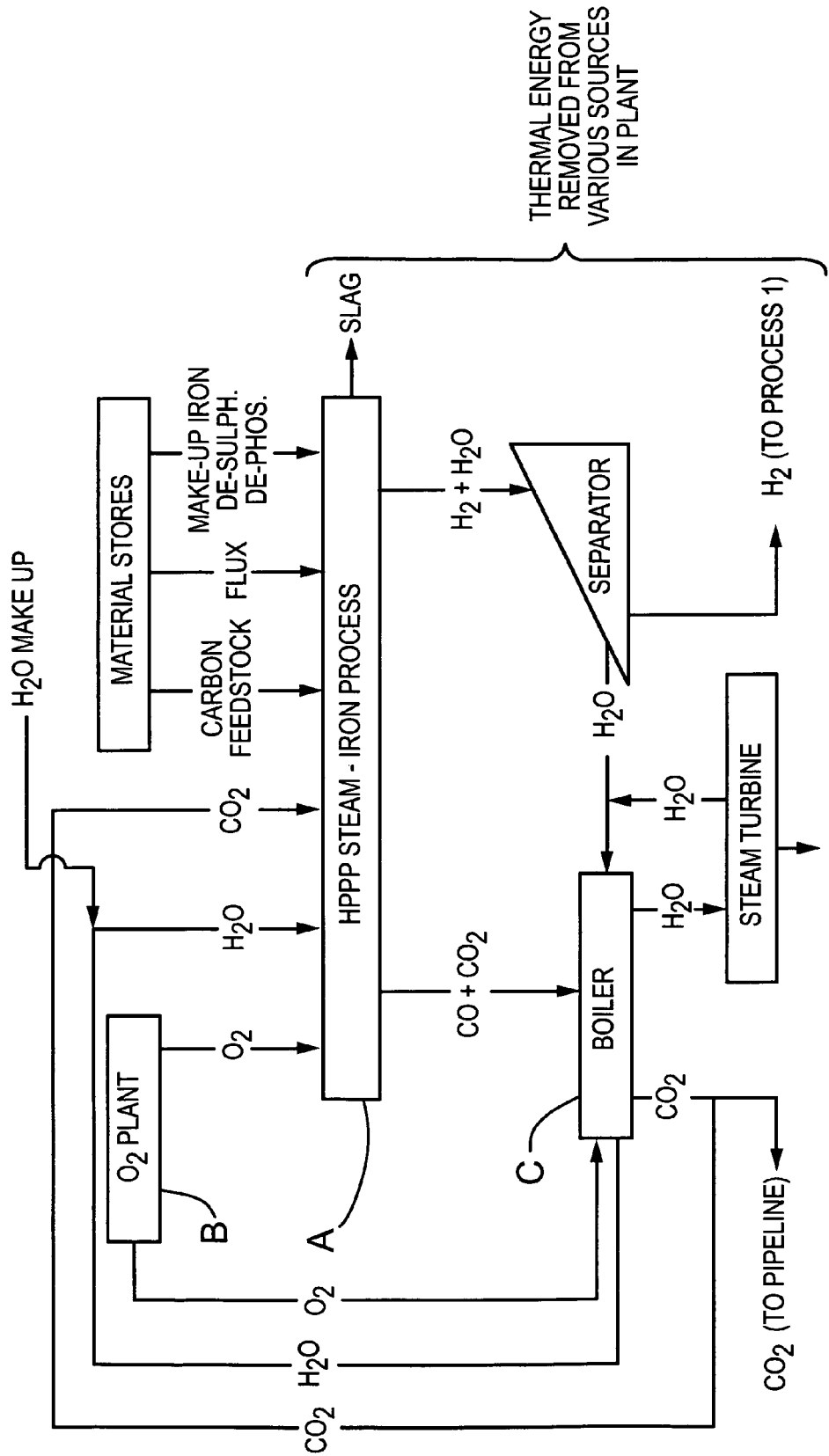
FIG. 5 shows a general process flow diagram for the HPPP process implemented in a hydrogen and electric power polygeneration plant, producing hydrogen, electric power and heat.

The HPPP process described above can be implemented in a polygeneration plant in different ways to achieve different objectives. The conventional poly-generation plant for producing hydrogen, electric power and heat from the HPPP process is shown in FIG. 5. The HPPP process is depicted by A. In this case oxygen produced by oxygen plant B is used to provide process heat needed by the molten bath through post combustion of CO and by "burning iron" in the HPPP process. The resulting mixture of CO and $CO_2$ from the reduction and refining reactions are used in an oxy-combustor, C, to produce steam, some of which is used to feed the oxidation reactor in the HPPP process, A, and with the balance used to produce electric power in a steam turbine. The $CO_2$ produced by combustion of CO and $O_2$ is high enough purity to be fed into a pipeline and sequestration system. An analysis of the energy balances for the process flows indicate that the steam turbine would produce up to 90 MW for a hydrogen plant producing 10 tonnes per hour assuming the carbon feedstock is petroleum coke.

Figure 6:
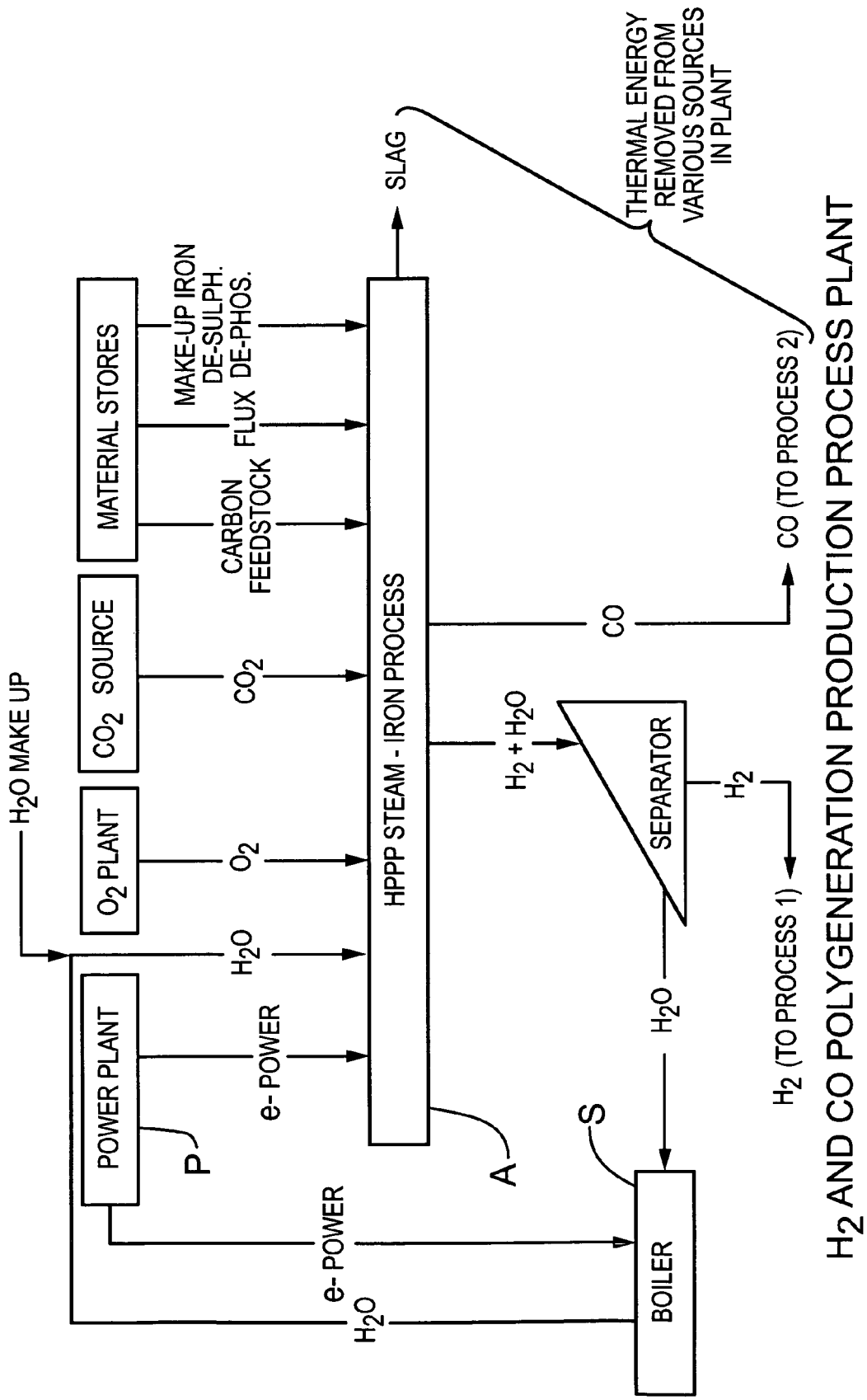
FIG. 6 shows a general process flow diagram for the HPPP process implemented in a hydrogen and CO polygeneration plant producing hydrogen, CO and heat.

FIG. 6 depicts a polygeneration plant that produces CO and $H_2$ by using electric power from power plant P to generate steam in steam generator S and provide process heat to reactors in HPPP, A. The heat would be generated from electric power using carbon electrode resistance heaters so that minimal CO is converted to $CO_2$. The choice of using an external power plant over using power generated by the process would be justified if two separate streams of CO and $H_2$ are needed and electric power is inexpensive such as at a power plant. In this case the process heat from the power plant could also be used to help produce steam rather than producing it by electrical heaters.

Figure 7:
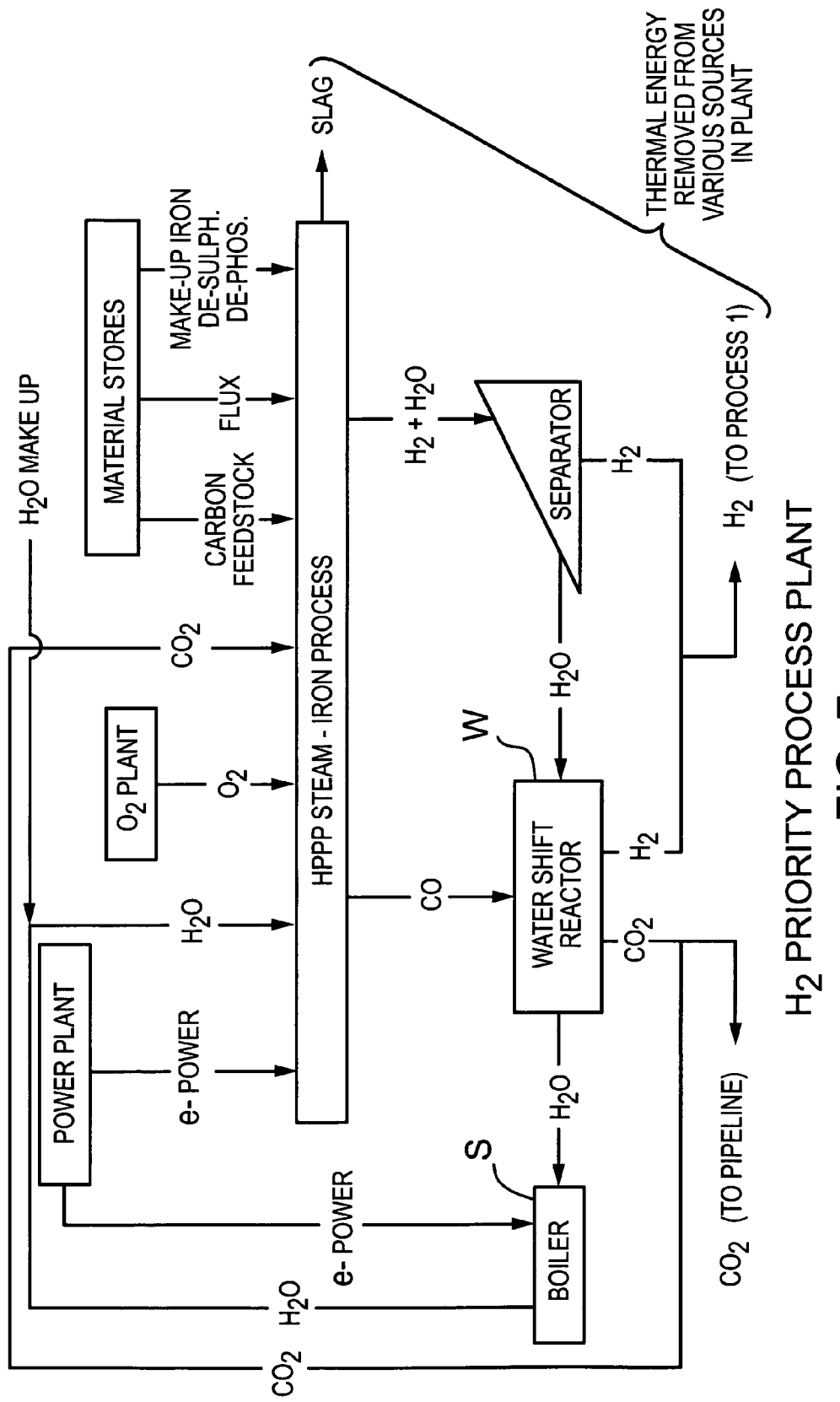
FIG. 7 shows a general process flow diagram for the HPPP process implemented in a hydrogen priority production plant which produces only hydrogen and heat.

FIG. 7 shows a hydrogen priority plant where electric power is used to generate steam in steam generator S, and heat for the reactors through electric heating the melt, electric power from power plant P, as in FIG. 6 and the CO and steam off-gas from the steam oxidation reactor are fed into a water shift reactor, W, to produce hydrogen and pure $CO_2$ suitable for sequestration. In this way the hydrogen production can be increased by a factor of two over the poly-generation process in FIG. 5 which produces hydrogen and electric power.

A significant advantage of the method of hydrogen production and the HPPP reactor design disclosed herein for implementing the hydrogen production method over the prior art described above is that it is a continuous process, which can produce hydrogen at a constant controlled rate. Other molten iron hydrogen processes described in the literature, for example see Malone U.S. Pat. No. 5,755,839 (1998) and Kindig U.S. Pat. No. 6,663,681 (2003), are bi-directional batch processes. The process dynamics of these processes from an operation and control view are non-conventional since the process is neither steady state nor does it run to a completion like a batch process. By operating a continuous process, reaction rates can be optimized by operating at a fixed point at the optimal temperature and reactant conditions and reaction volumes can be substantially reduced. Also equipment, piping etc., can be appropriately sized to meet a narrower range of process conditions.

In terms of feedstock the present process has advantages as it can use any carbon material, even beneficiated coal, such as carbon black or pyrolized forms of coal such as char which have reduced hydrogen content, to produce a pure $H_2$ stream and pure $CO$—$CO_2$ stream without gas separation and potentially lower oxygen consumption when compared to gasification. The hydrogen stream can be used as a chemical feedstock or as an energy carrier within a hydrogen energy system.

The carbon monoxide handled in an oxygen-blown combustor produces $CO_2$ that is in a form suitable for capture and sequestration. The CO can also be collected as a chemical feedstock such as needed in methanol production or production of synthetic fuels. This system is particularly suitable for hydrogen priority production processes as the hydrogen produced is independent of the hydrogen content of the carbonaceous feedstock used.

An inventive feature of either of these hydrogen production routes is the hydrogen generator (the said "first reactor compartment") can sustain a continuous controlled steam-oxidation process and thereby a constant hydrogen production rate. The gas streams from the reduction reaction (the "second reactor compartment") and decarbonization reaction when combined form a syn gas stream of CO, $H_2$ and $CO_2$, while the gas stream for the steam oxidation process is hydrogen of relatively high purity.

Alternatively the third reactor-step (the said "third reactor compartment") may be dropped from the process to create a two compartment reactor where the iron is circulated between the oxidation and reduction compartments. In this case the steam oxidation will produce a mixture of CO and $H_2$. Subject to the gas purity requirements of the hydrogen application a separation process, such as pressure swing absorption (PSA), is needed to extract the hydrogen flow, or alternatively the CO component in the gas can be converted to hydrogen in a water gas shift reactor and the CO2 produced is separated from the hydrogen stream. In this case the size of the oxidation reactor is preferably large enough to dilute the incoming stream of iron to achieve a low enough level of concentration of carbon in the iron bath, under 0.5% but preferably less than 0.1% carbon in the bath, to insure that the stream iron process can run at the required rate. A gas purity monitoring system can measure the concentration of the CO in the $H_2$ to infer the concentration of carbon in solution with iron to adjust the rate of addition of iron into the reactor. These measurements can be corrected for alloy variations in the iron by periodically sampling the iron composition of the iron in the bath.

An aspect of the invention is a reactor designed for steam oxidation of iron in a circulating molten iron process. The primary purpose of the process is to produce a relatively high and consistent purity of hydrogen gas ($H_2$) at a controlled rate of production for large-scale consumers, and for secondary purposes, production of a syn-gas (CO) suitable for combustion or other chemical use. The process disclosed herein is referred to a hydrogen priority poly-generation process (HPPP).

Hydrogen production is accomplished by injecting steam at high temperature, and at a controlled rate into a first bath of relatively pure molten iron of controlled purity so as not to reduce the steam-iron oxidation rate below the level which the steam generator can compensate by increasing the steam injection rate, producing hydrogen gas ($H_2$) and ferrous slag (FeO). The $H_2$ gas stream may also contain CO subject to the carbon content in the molten iron in the first vessel. Additional CO is produced in a second vessel, where the iron is recovered by reducing iron oxide to iron by injecting a carbonaceous feed into the second vessel.

The circulation of iron inside the process involves multiple phases, which can be identified as: the alloy phase being predominantly iron, the slag phase being predominantly ferrous slag from the iron steam reaction and nonferrous slag being predominantly ash from the carbonaceous feed, which lighter than the ferrous alloy component floats on the surface of the molten iron bath; and the gas phase, being the volatile components released when the carbonaceous materials are injected into the ferrous slag, and the synthesis gas generated by the reactions involving iron.

Another feature is an embodiment of the process involves three steps which can be configured in two zones in two compartments, or in three physically separated zones which when the buffer between the iron refining step and the steam oxidation step is included occurs in four compartments. In order to ensure the continuous production of hydrogen, only the steam oxidation reaction rate needs to be controlled. The other two reactions, reduction and decarbonization/iron refining, can be configured as batch or continuous processes where the reaction rates can vary with time to suit material and process requirements and the variation in reaction rates are managed by the iron inventory carried by the holding vessel feeding the steam oxidation reactor as well as occasional increase or decrease in inventory of alloy and ferrous slag in the steam oxidation vessel. This method of managing hydrogen inventory in the process, using liquid iron, being superior to carrying a large buffer of hydrogen gas downstream, is a key advantage of this hydrogen production method.

A feature of the apparatus of the present invention is that although the circulation of iron in the reactor joins the three steps in the process, the three reactions take place such that gas purities are controlled. Relying on the density difference between the alloy and the slag phase, the alloy phase will fall to the bottom of the reactor and the slag phase will rise to the top. This density difference can be assisted by a pump, such as an electromagnetic or any other pump device, to cause a pressure difference between locations in the reactor, acting to change the level of Fe in the reactor and push the FeO out of the top of oxidation reactor compartment, and in this manner the pump operating between compartments creates circulation of the molten iron-iron oxide in the bath through the three steps of the process zones. Alternatively the iron/iron oxide can be tapped from the different compartments as separate vessels and transported by ladles, or the reactors heights can be arranged to use gravity to flow iron from one reactor to another for example by means of a launder.

The hydrogen gas purity is maintained by the iron purity and the physical isolation of the out-gas of the steam oxidation reaction from the other parts of the process. The steam oxidation reactor compartment can be sized such that the hydrogen in the steam oxidation reactor rises in the slag faster than the slag outflow from the steam oxidation reactor hence reducing gas entrainment between steam oxidation and reduction compartments. Since the inflow and outflow of reactants is nominally continuous the steam oxidation reactor volume can be quite small and the geometry of the reactor can be selected to maximize the surface of molten iron seen by the steam injection, and minimize the thickness of slag layer that can cause re-conversion of FeO to Fe through direct hydrogen reduction of FeO in the slag layer, thereby resulting in a loss in efficiency.

Implementing the process two, or three separate reactor compartments are required, and in the three reactor compartment system additional holding vessel(s) (buffer volume (s)) may be added between the iron refining step and the steam oxidation step, and depending on reaction rates at each step, which depends on the composition of the carbon source used, multiple reactors, staggered in time at each step, may be needed to provide a more consistent production rate.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method for continuous hydrogen production at a controlled rate comprising the steps of:
   a) oxidizing molten iron by injecting steam at a controlled rate into the molten iron in a first reaction zone to produce a hydrogen containing gas stream and molten iron oxide in the first reaction zone, wherein said molten iron oxide forms a portion of a molten ferrous slag, and collecting and storing said hydrogen containing off gas stream;
   b) circulating the molten ferrous slag containing the molten iron oxide to at least a second reaction zone and reducing said molten iron oxide by injecting a carbonaceous material into said at least a second reaction zone to form a carbon monoxide containing gas stream and carbon saturated molten iron in said at least a second reaction zone;
   c) processing the carbon saturated molten iron to circulate molten iron into the first reaction zone having a reduced carbon content relative to the carbon saturated molten iron in the second reaction zone; and
   d) repeating steps a) to c) to give continuous hydrogen production at a selected hydrogen production rate.

2. The method according to claim 1 wherein step c) of processing the carbon saturated molten iron includes a step of decarbonizing said carbon saturated molten iron by injecting a decarbonizing agent into said carbon saturated molten iron in the at least a second reaction zone to produce a carbon monoxide containing gas stream and treated molten iron, and collecting and storing said carbon monoxide containing gas stream and circulating the processed molten iron to said first reaction zone, and wherein the step of decarbonizing said carbon saturated molten iron reduces the carbon content sufficiently such that the steam oxidation of iron can occur in the first reaction zone.

3. The method according to claim 1 wherein the first reaction zone is configured to be of a larger volume than the at least a second reaction zone, and wherein step c) of processing the carbon saturated molten iron to molten iron having a reduced carbon content relative to the carbon saturated molten iron back to the first reaction zone is achieved by circulating said carbon saturated molten iron into said first reaction zone wherein the first reaction zone is of sufficiently larger volume and contains molten iron of sufficiently lower carbon concentration than the carbon saturated molten iron to dilute a carbon concentration in the carbon saturated molten iron to a carbon concentration in the molten iron to a level at which steam oxidation of iron can occur in the first reaction zone.

4. The method according to claim 1 wherein the hydrogen production rate is controlled by, in addition to controlling the rate of steam injection into the first reaction zone, controlling a concentration of iron oxide in the said first reaction zone, by any one or combination of, adjusting its rate of departure from said first reaction zone or accelerating a rate of iron addition to said first reaction zone or by adding various fluxing agents, by adjusting a quantity of the treated molten iron and carbon concentration of the treated molten iron circulated into said first reaction zone.

5. The method according to claim 1 wherein step c) of processing the carbon saturated molten iron to circulate molten iron having a reduced carbon content relative to the carbon saturated molten iron back to the first reaction zone includes circulating the carbon saturated molten iron to at least a third reaction zone, and including decarbonizing said carbon saturated molten iron by injecting a decarbonizing agent into said carbon saturated molten iron in the at least third reaction zone to produce a carbon monoxide containing off gas stream and treated molten iron, and collecting and storing the carbon monoxide containing gas stream and circulating the treated molten iron to said first reaction zone, and wherein the step of decarbonizing said carbon saturated molten iron reduces the carbon content sufficiently such that the steam oxidation of iron can occur in the first reaction zone.

6. The method according to claim 5 wherein the said first reaction zone and said third reaction zone share the same molten iron bath but the off gas stream of the first reaction zone and the off gas stream from the third reaction zone are separately collected.

7. The method according to claim 1 further comprising injection of at least one of oxygen and air or a mixture thereof into the molten iron in the first reaction zone to produce heat by oxidation of a portion of said treated molten iron to produce molten iron oxide.

8. The method according to claim 2 wherein said decarbonizing agent is selected from the group consisting of air, steam, $CO_2$ and pure oxygen or any mixture thereof.

9. The method according to claim 2 wherein said step of decarbonizing said carbon saturated molten iron is carried out until a concentration of carbon present in the now treated molten iron is less than approximately 0.5% carbon in iron by weight.

10. The method according to claim 2 wherein said step of decarbonizing said carbon saturated molten iron is carried out until a concentration of carbon present in the now treated molten iron is less than approximately 0.1% carbon in iron by weight.

11. The method according to claim 3 wherein the volume of first reaction zone is selected to be sufficiently larger than the volume of the at least a second reaction zone such that the carbon saturated molten iron circulated into the first reaction zone is diluted sufficiently so that the concentration of carbon present in the treated molten iron is less than approximately 0.5% carbon in iron by weight.

12. The method according to claim 3 wherein the volume of first reaction zone is selected to be sufficiently larger than the volume of the at least a second reaction zone such that the carbon saturated molten iron circulated into the first reaction zone is diluted sufficiently so that the concentration of carbon present in the treated molten iron is less than approximately 0.1% carbon in iron by weight.

13. The method according to claim 1 wherein desulphurization agents and/or fluxing agents are injected into the first or second reaction zone to form part of the molten ferrous slag phase.

14. The method according to claim 1 wherein a portion of impurity sulphur and ash contained in said carbonaceous material injected into the at least a second reaction zone is accumulated within the molten ferrous slag phase within the second reaction zone, and including a step of performing periodic deslagging of a portion of said molten ferrous slag phase in the at least a second reaction zone.

15. The method according to claim 1 wherein a portion of impurity sulphur and ash contained in said carbonaceous material injected into said at least a second reaction zone and part of said molten ferrous slag phase is continuously removed from the at least a second reactor zone.

16. The method according to claim 1 wherein said molten ferrous slag phase containing the molten iron oxide in step a) is transferred from said first reaction zone to said at least a second reaction zone at a controlled rate.

17. The method according to claim 1 wherein injection of carbonaceous material in said step b) occurring in said at least a second reaction zone is temporarily halted, and thereafter an oxidant injected to treat the molten iron.

18. The method according to claim 1 including an additional first reaction zone, and including an external source of molten iron for feeding molten iron to both the first reaction zone and the additional first reaction zone, and wherein the molten ferrous slag containing the molten iron oxide produced in the additional first reaction zone is circulated to the at least a second reaction zone, and wherein each of the first reaction zone and the additional first reaction zone are operated at less than 100% capacity.

19. The method of claim 18 including controlling an amount of molten iron delivered to the first reaction zone and the additional first reaction zone for independently adjusting the hydrogen production rate during periods of operation where insufficient hydrogen production occurs due to planned or unplanned process stoppages in one or more of the reaction zones are unavailable.

* * * * *